(12) United States Patent
Mihara et al.

(10) Patent No.: US 7,035,433 B1
(45) Date of Patent: Apr. 25, 2006

(54) IMAGE RECOGNITION METHOD AND APPARATUS

(75) Inventors: Isao Mihara, Tokyo (JP); Yasunobu Yamauchi, Kawasaki (JP); Akira Morishita, Tokyo (JP); Miwako Doi, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/471,497

(22) Filed: Dec. 23, 1999

(30) Foreign Application Priority Data

Dec. 25, 1998 (JP) ................................ 10-371332

(51) Int. Cl.
*G06K 9/00* (2006.01)

(52) U.S. Cl. ...................... 382/107; 348/155; 348/699; 345/419

(58) Field of Classification Search ................ 382/103, 382/236, 151, 289–294, 107; 348/699, 155
See application file for complete search history.

(56) References Cited

U.S. PATENT DOCUMENTS

| 5,173,865 | A | * | 12/1992 | Koike et al. ................. 702/155 |
| 5,581,276 | A | * | 12/1996 | Cipolla et al. ............... 345/156 |
| 5,642,166 | A | * | 6/1997 | Shin et al. ............. 375/240.15 |
| 5,845,006 | A | * | 12/1998 | Sumi et al. .................. 382/154 |
| 6,072,496 | A | * | 6/2000 | Guenter et al. ............. 345/419 |
| 6,075,905 | A | * | 6/2000 | Herman et al. ............. 382/284 |
| 6,088,472 | A | * | 7/2000 | O'Donnell et al. ......... 382/128 |
| 6,157,677 | A | * | 12/2000 | Martens et al. ........ 375/240.16 |
| 6,157,747 | A | * | 12/2000 | Szeliski et al. ............. 382/284 |
| 6,303,920 | B1 | * | 10/2001 | Wixson ................... 250/208.1 |
| 6,493,041 | B1 | * | 12/2002 | Hanko et al. ............... 348/699 |

FOREIGN PATENT DOCUMENTS

| JP | 8-149461 | 6/1996 |
| JP | 8-331607 | 12/1996 |
| JP | 0-185708 | 7/1997 |
| JP | 9-265538 | 10/1997 |
| JP | 5-165968 | 7/1998 |

OTHER PUBLICATIONS

Eckehard Steinbach, Alan Hanjalic, and Bernd Girod ("3D Motion and Scene Structure Estimation with Motion Dependent Distortion of Measurement Windows"; Telecommunications Institute, University of Erlangen-Nuremberg, 1996 IEEE).*

Tamio Arai and Kazunori Umeda ("Measurement of 3D Motion Parameters from Range Images", IEEE/RSJ International Workshop on Intelligient Robots and Systems IROS '91, Nov. 3-5, 1991, Osaka, Japan, IEEE Cat. No. 91TH0375-6).*

(Continued)

*Primary Examiner*—Samir Ahmed
*Assistant Examiner*—Anand Bhatnagar
(74) *Attorney, Agent, or Firm*—Oblon, Spivak, McClelland, Maier & Neustadt, P.C.

(57) ABSTRACT

An image recognition apparatus has an image capture section for capturing a range image, an image deformation section for deforming the range image captured by the image capture section, and a recognition section for recognizing the presence/absence of three-dimensional motion of an object by comparing the deformed image obtained by the image deformation section, and a new range image captured by the image capture section.

7 Claims, 23 Drawing Sheets

OTHER PUBLICATIONS (Computer Vision Face Tracking For Use in a perceptual User Interface, Gary R. Bradski, Microcomputer reaserach lab, Santa Clara Ca, Intel Corporation, Second Quarter 1998).*

Wan et al. ("Neural Networs for 3D Motion Detection From a Sequence of Image Frames," Chan Lai Wan and Yip Pak Ching, IEEE, computer Science Dept., The Chinese University of Hong Kong, 1991).*

Masuda et al. ("A robust method for registration and segmentation of multiple range images," Masuda, T.; Yokoya, N.; CAD-Based Vision Workshop, 1994., IEEE, Proceedings of the 1994 Second , Feb. 8-11, 1994 pp.:106-113).*

Hiura et al. ("Real-time object tracking by rotating range sensor," Hiura, S.; Yamaguchi, A.; Sato, K.; Inokuchi, S.; Pattern Recognition, 1996., IEEE, Proceedings of the 13th International Conference on , vol.: 1 , Aug. 25-29, 1996 pp.:825-829.*

Sato et al. ("Recovering shape and reflectance properties from a sequence of range and color images," Sato, Y.; Ikeuchi, K.; Multisensor Fusion and Integration for Intelligent Systems, 1996. IEEE/SICE/RSJ International Conference on , Dec. 8-11, 1996 Pages.*

* cited by examiner

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 255 | 0 | 0 | 0 | 0 | 0 |
| 0 | 0 | 250 | 0 | 0 | 0 | 0 | 0 |
| 0 | 0 | 250 | 0 | 0 | 0 | 0 | 0 |
| 0 | 220 | 250 | 0 | 220 | 0 | 0 | 0 |
| 0 | 220 | 220 | 0 | 220 | 0 | 0 | 0 |
| 0 | 220 | 220 | 200 | 200 | 0 | 0 | 0 |

SEGMENT IN UNITS OF VOXELS

⇩ COMPUTE (x', y', z')
USING EQUATION (1)

⇩ RECONSTRUCT
RANGE IMAGE

SAMPLE IMAGE

DEFORMED IMAGE

DEFORMED IMAGE

COMPARISON

LATEST IMAGE

SAMPLE IMAGE

DEFORMED IMAGE

DEFORMED IMAGE

DEFORMED IMAGE

DEFORMED IMAGE

LATEST IMAGE

SAMPLE IMAGE

DEFORMED IMAGE

DEFORMED IMAGE

DEFORMED IMAGE

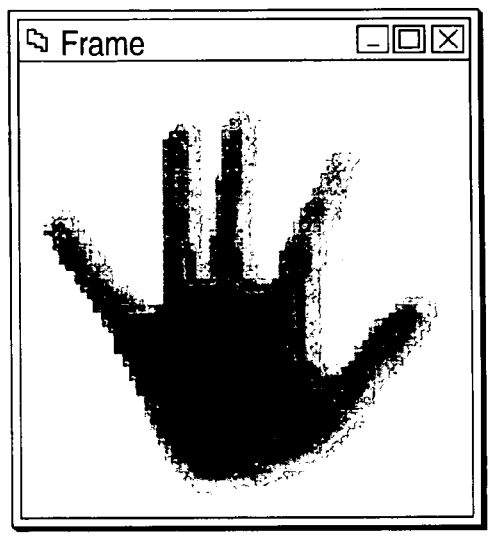
DEFORMED IMAGE
FIG. 26
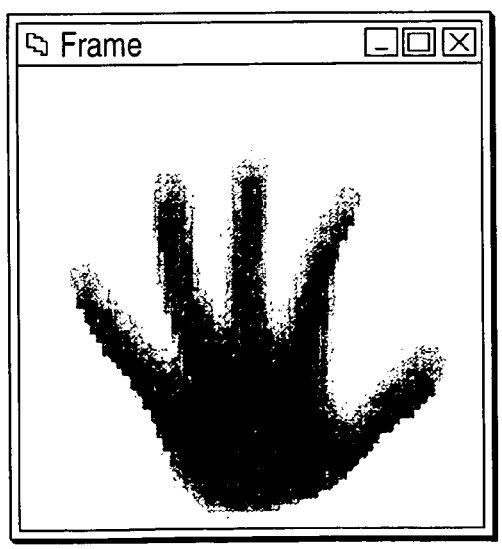 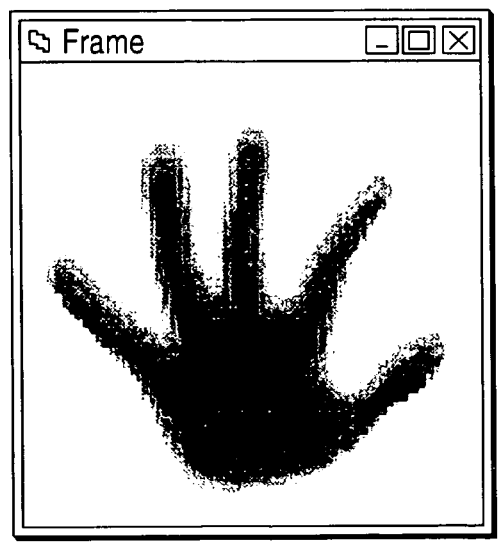
DEFORMED IMAGE
FIG. 27A
DEFORMED IMAGE
FIG. 27B

DEFORMED IMAGE

DEFORMED IMAGE

DEFORMED IMAGE

DEFORMED IMAGE

DEFORMED IMAGE

DEFORMED IMAGE

IMAGE RECOGNITION METHOD AND APPARATUS

BACKGROUND OF THE INVENTION

This application is based on Japanese Patent Application No. 10-371332, filed Dec. 25, 1998, the contents of which are incorporated herein by reference.

The present invention relates to an image recording apparatus and method for recognizing the shape and/or movement of an image on the basis of a captured range image or range image stream.

Conventionally, upon recognizing three-dimensional motions such as motions of the hand, face, and the like of a person, the object to be recognized such as the hand, face, or the like is sensed from its front side using an image sensing apparatus such as a video camera or the like. Then, recognition is made by estimating three-dimensional motion using limited changes in two-dimensional (without any depth information) motion that appears in the sensed image, and various other kinds of knowledge.

Some recognition methods will be explained blow.

The first method estimates motion using feature points of the object to be recognized. In this method, some feature points are set in advance on the object to be recognized, and motion is estimated using a change in positional relationship between the feature points. For example, upon recognizing a horizontal shake (horizontal rotation) of the face, several feature points of the face are set at the eyes, nose, and the like, and a clockwise shake of the face is estimated from changes, e.g., the feature points at the positions of the eyes have moved horizontally, the spacing between the feature points at the two eyes has decreased, the feature point at the right eye has disappeared (since the right eye has moved to a position that cannot be seen from the camera), and so forth upon movement of the face.

However, when this method is used, markers and the like must be pasted at the positions of the feature points of the face to stably obtain the corresponding points in a camera image, and the environment that can use this method is limited. In some cases, no markers are used. However, in such case, feature points cannot be stably extracted, and much computation cost is required to obtain feature points.

Another method estimates motion by obtaining changes in motion moment. This method exploits the fact that when a hand is rotated about a vertical axis, the forward projection area of the hand in the horizontal direction changes dramatically, but it does not change much in the vertical direction. In such case, rotation of the hand about the vertical axis is estimated solely because the motion moment of the hand in the horizontal direction changes considerably.

This method can estimate three-dimensional motion. However, since the shape of the object that can be used in recognition is limited, and different two-dimensional motions can hardly be distinguished from each other, recognition errors readily occur.

Also, a method of estimating motion from the geometric shape of the object to be recognized is known. For example, when three-dimensional motion of a dice is to be recognized, it is estimated that the dice has been cast when the one pip is seen via the camera at a given timing, and then it changes to the three pips. Since this method exploits knowledge about geometric stereoscopic information of the object to be recognized, three-dimensional motion can be relatively reliably estimated. However, objects that can be recognized are limited. In addition, geometric knowledge about that object is required, resulting in poor versatility.

Also, various other methods are available. However, in these methods, since three-dimensional motion is estimated from an image that has only two-dimensional information, it is difficult to stably recognize three-dimensional motion with high precision. At the time of capturing an image of a three-dimensional object by a camera as two-dimensional information, a large number of pieces of important information are lost.

To avoid these problems, an object is simultaneously sensed by a plurality of video cameras at several positions, corresponding points among the cameras are obtained to compute stereoscopic information from a plurality of sensed images, and three-dimensional motion is obtained using the computed information.

In this method, since the stereoscopic information is defined based on a plurality of sensed images in practice, problems posed when three-dimensional information is estimated from two-dimensional information can be solved. However, since computations of the corresponding points used to stereoscopically combine images from the plurality of cameras require much time, this method is not suitable for a real-time process. In order to obtain corresponding points, since camera position information is required, the camera positions are limited and they must be calibrated.

As described above, the conventional methods for recognizing three-dimensional motion from an image suffer various problems.

In the conventional method, since the object to be recognized is captured using, e.g., a video camera, as an image having only two-dimensional information, three-dimensional motion must be recognized based on only the two-dimensional information, and it is hard to stably recognize three-dimensional motion with high precision.

Also, the object to be recognized must be prepared in advance as a template or a recognition dictionary, resulting in cumbersome operations. Also, the templates and recognition dictionary must be modified in correspondence with the object to be recognized, resulting in high cost.

Furthermore, matching with a huge number of templates is required upon recognition, and a long recognition time is required.

BRIEF SUMMARY OF THE INVENTION

It is an object of the present invention to provide an image recognition method which can stably and quickly recognize three-dimensional motion with high precision without requiring any templates or dictionary for recognition, since a three-dimensional deformed image of a range image corresponding to an object is used, and an image recognition apparatus using that method.

In order to achieve the above object, according to the first aspect of the present invention, an image recognition method is characterized by recognizing the presence/absence of three-dimensional motion of an object in a range image by comparing a deformed image obtained by deforming a captured range image with a newly captured range image.

According to the second aspect of the present invention, an image recognition method is characterized by recognizing the presence/absence of three-dimensional motion of an object in a range image by comparing a deformed image obtained by deforming a captured range image with a newly captured range image, and recognizing a series of motions recognized from each of a series of a plurality of range images.

According to the third aspect of the present invention, an image recognition apparatus comprises image capture means for capturing a range image, image deformation means for deforming the range image captured by the image capture means, and recognition means for recognizing the presence/absence of three-dimensional motion of an object by comparing a deformed image obtained by the image deformation means and a new range image captured by the image capture means.

According to the fourth aspect of the present invention, an image recognition apparatus comprises image capture means for capturing a range image, image deformation means for deforming the range image captured by the image capture means, first recognition means for recognizing the presence/absence of three-dimensional motion of an object by comparing a deformed image obtained by the image deformation means and a new range image captured by the image capture means, and second recognition means for recognizing a series of motions recognized from each of a series of a plurality of range images by the first recognition means.

According to the fifth aspect of the present invention, an image recognition apparatus comprises image capture means for capturing a range image, storage means for storing the range image captured by the image capture means, image deformation means for deforming a designated range image of the range image captured by the image capture means and/or the range image stored in the storage means, and recognition means for recognizing the presence/absence of three-dimensional motion of an object by comparing one of a deformed image obtained by the image deformation means and the range image stored in the storage means, and a new range image captured by the image capture means.

According to the sixth aspect of the present invention, an image recognition apparatus comprises image capture means for capturing a range image, storage means for storing the range image captured by the image capture means, image deformation means for deforming a designated range image of the range image captured by the image capture means and/or the range image stored in the storage means, first recognition means for recognizing the presence/absence of three-dimensional motion of an object by comparing one of a deformed image obtained by the image deformation means and the range image stored in the storage means, and a new range image captured by the image capture means, and second recognition means for recognizing a series of motions recognized from each of a series of a plurality of range images by the first recognition means.

According to the present invention, since a three-dimensional deformed image of a range image corresponding to an object is used, the presence/absence of three-dimensional motion can be stably and quickly recognized with high precision without requiring any templates or dictionary for recognition.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 26 shows a deformed image which is generated from the sample image shown in FIG. 22, and is turned slightly leftward on the plane of paper by rotating the sample image about the barycentric position of the hand;

FIGS. 27A and 27B show two deformed images which are generated from the sample image shown in FIG. 22, and which are turned slightly upward by rotating the sample image through different angles about the barycentric position of the hand;

DETAILED DESCRIPTION OF THE INVENTION

Preferred embodiments of the present invention will be described hereinafter with reference to the accompanying drawings.

(First Embodiment)

The first embodiment of the present invention will be explained first.

Figure 1:
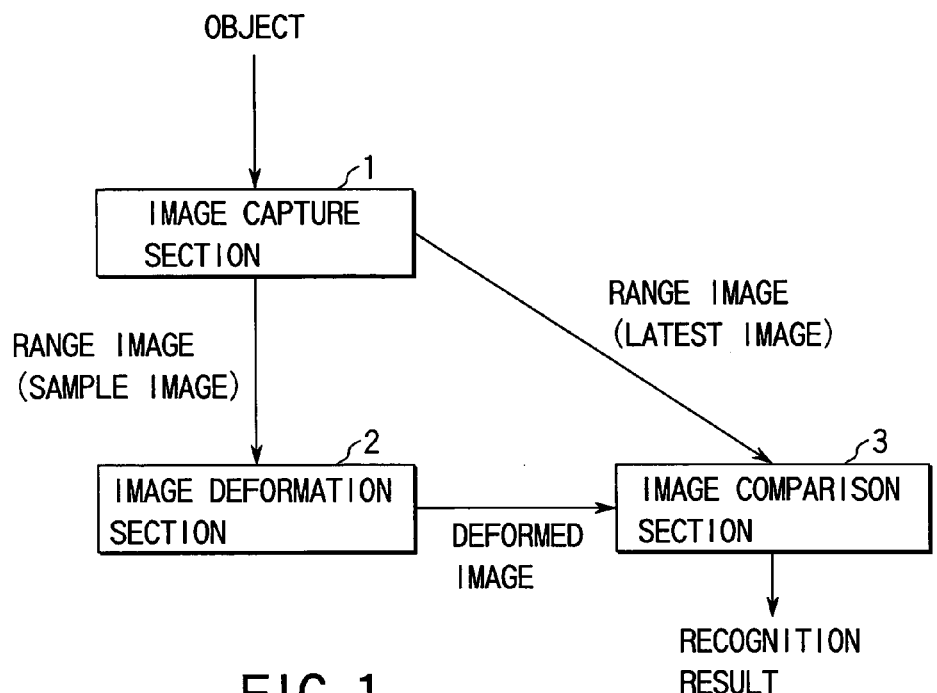
FIG. 1 is a schematic block diagram showing an example of the arrangement of an image recognition apparatus according to the first embodiment of the present invention.

FIG. 1 is a block diagram showing the overall arrangement of an image recognition apparatus according to the first embodiment of the present invention.

The image recognition apparatus of this embodiment is constructed by an image capture section 1 comprising image sensing means for capturing a range image stream, an image deformation section 2 for performing a three-dimensional rotation deformation process of an arbitrary range image captured by the image capture section 1, and an image comparison section 3 for comparing the deformed range image obtained by the image deformation section 2 with an arbitrary range image in the range image stream captured by the image capture section 1.

The image capture section 1 and range image will be explained below.

The image capture section 1 captures an object to be recognized (e.g., the hand, face, whole body, or the like of a person) as images having depth values that reflect the three-dimensional shape of the object (to be referred to as range images hereinafter) at predetermined time intervals (e.g., every 1/30 sec) (the unit 1 can be implemented using, e.g., an image capture method of Japanese Patent Publication No. 8-274949).

Since range images are captured at predetermined time intervals, they are sequentially held in an internal or external memory or the like of the image capture section 1, thus obtaining a moving picture of the object based on the range images (to be referred to as a range image stream hereinafter). At this time, the range image stream is obtained as a set of a plurality of frames of range images such as "latest range image", "range image t sec before (to be referred to as "one frame before" hereinafter) the latest range image", "range image 2t sec before (to be referred to as "two frames before" hereinafter) the latest range image", and the like.

Figure 2:
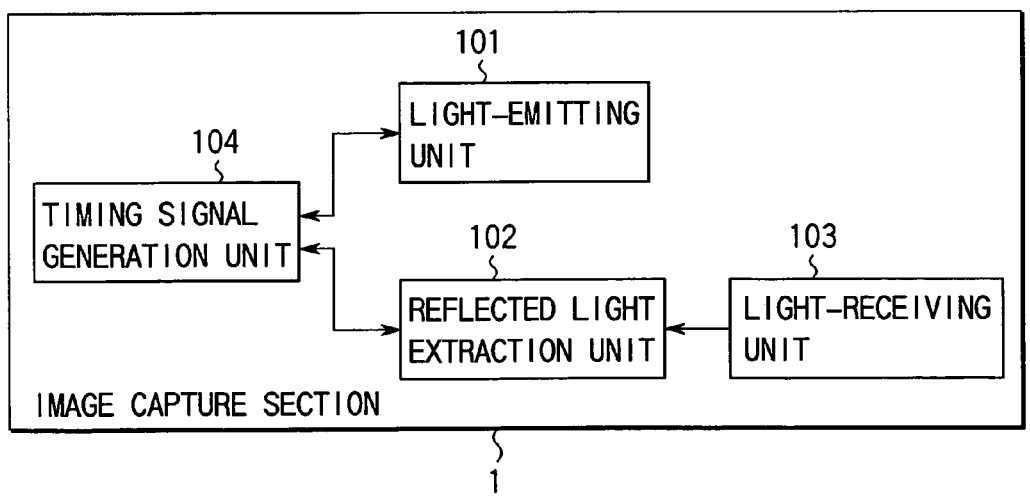
FIG. 2 is a schematic diagram showing the arrangement of an image capture section.

The image capture section 1 is mainly comprised of a light-emitting unit 101, light-receiving unit 103, reflected light extraction unit 102, and timing signal generation unit 104, as shown in FIG. 2.

The light-emitting unit 101 emits light whose intensity varies along with time in accordance with timing signals generated by the timing signal generation unit 104. This light strikes an object in front of the light-emitting unit.

The light-receiving unit 103 detects the amount of light emitted by the light-emitting unit 101 and reflected by the object.

The reflected light extraction unit 102 extracts the spatial intensity distribution of the reflected light received by the light-receiving unit 103. Since the spatial intensity distribution of the reflected light can be considered as an image, it will be referred to as a reflected light image or range image hereinafter.

The light-receiving unit 103 receives not only the light emitted by the light-emitting unit 101 and reflected by the object, but also external light such as illumination light, sunlight, and the like at the same time. Hence, the reflected light extraction unit 102 extracts only light components emitted by the light-emitting unit 101 and reflected by the object by computing the difference between the amount of light received when the light-emitting unit 101 emits light, and that received when the light-emitting unit 101 does not emit light.

Figures 3, 4:
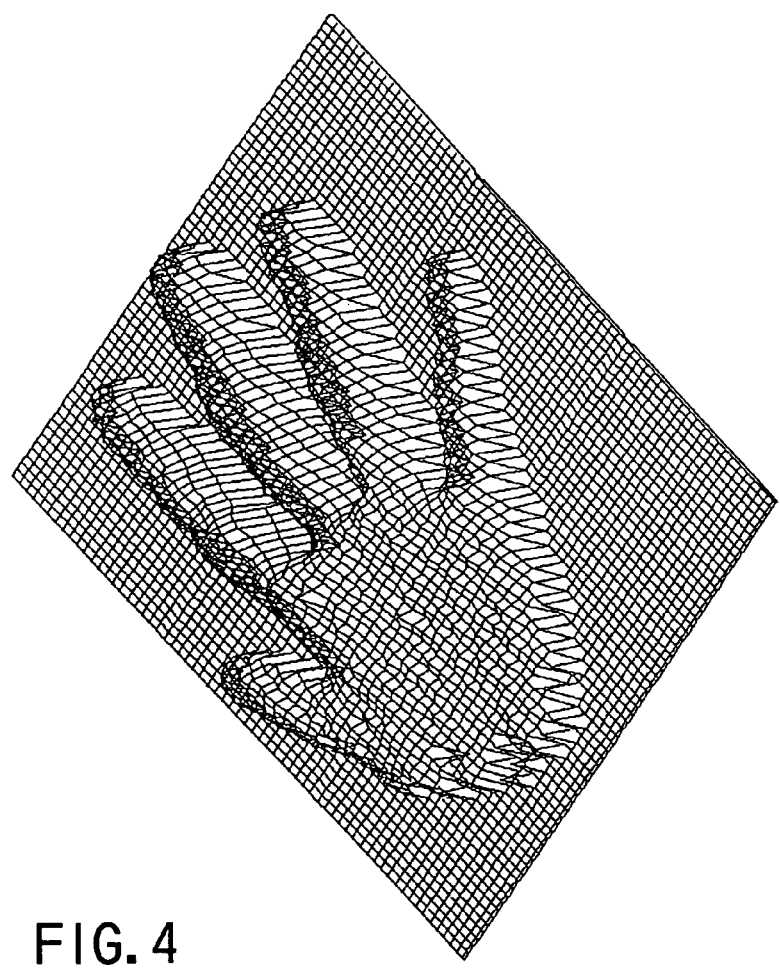
FIG. 3 shows a matrix of a range image.
FIG. 4 three-dimensionally shows the range image.

The reflected light extraction unit 102 extracts the intensity distribution, i.e., a reflected light image (range image) shown in FIG. 3, from the reflected light received by the light-receiving unit 103.

FIG. 3 shows an 8×8 pixel reflected image as a part of a 256×256 pixel reflected light image for the sake of simplicity.

Light reflected by an object decreases at a higher rate with increasing distance to the object. When the surface of an object uniformly scatters light, the amount of light received per pixel of the reflected light image decreases in inverse proportion to a square of the distance to the object.

Each pixel value of the reflected light image represents the amount of reflected light received by a unit light-receiving unit corresponding to that pixel. Reflected light is influenced by the nature of the object (specular reflection, scattering, absorption, and so forth), the direction of the object, the distance to the object, and the like. When the entire object uniformly scatters light, the reflected light amount is intimately related to the distance to the object. Since a hand or the like has such nature, a three-dimensional image shown in FIG. 4, which reflects the distance to the hand, the tilt of the hand (locally having different distances), and the like, can be obtained as a reflected light image obtained when the hand is stretched out to a position in front of the image capture section 1.

Figure 5:
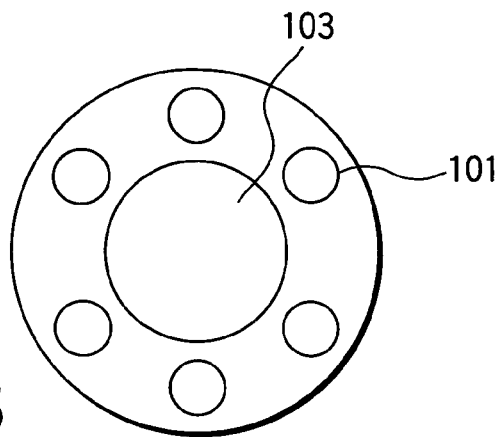
FIG. 5 is a plan view showing an example of the outer appearance of light-emitting and light-receiving sections that construct the image capture section.

FIG. 5 shows an example of the outer appearance of the light-emitting unit 101 and light-receiving unit 103 that construct the image capture section 1 described in Japanese Patent Publication No. 9-299648. The light-receiving unit 103 comprised of a circular lens and an area sensor (not shown) located behind the lens is set at the center of the unit 1, and a plurality of (e.g., six) light-emitting units 101 each consisting of an LED for emitting light such as infrared light or the like are set at equal angular spacings along the perimeter of the circular lens.

Light emitted by each light-emitting unit 101 is reflected by the object, and the reflected light is focused by the lens of the light-receiving unit 103 and is received by the area sensor located behind the lens. The area sensor consists of sensors in, e.g., a 256×256 matrix, and the intensity of reflected light received by each sensor in the matrix becomes the corresponding pixel value. An image captured in this manner is a range image, that is, the intensity distribution of reflected light, as shown in FIG. 3.

FIG. 3 shows part of range image data (8×8 pixels as a part of 256×256 pixels). In this example, each cell value (pixel value) in a matrix represents the intensity of the captured reflected light by 256 levels. For example, a cell with a value "255" indicates a pixel which is closest to the image capture section 1, and a cell with a value "0" indicates a pixel which is farthest from the image capture section 1, i.e., that reflected light does not reach the image capture section 1.

FIG. 4 three-dimensionally depicts the entire range image data in the matrix shown in FIG. 3. This example shows the range image data of the hand of a person.

Figure 6:
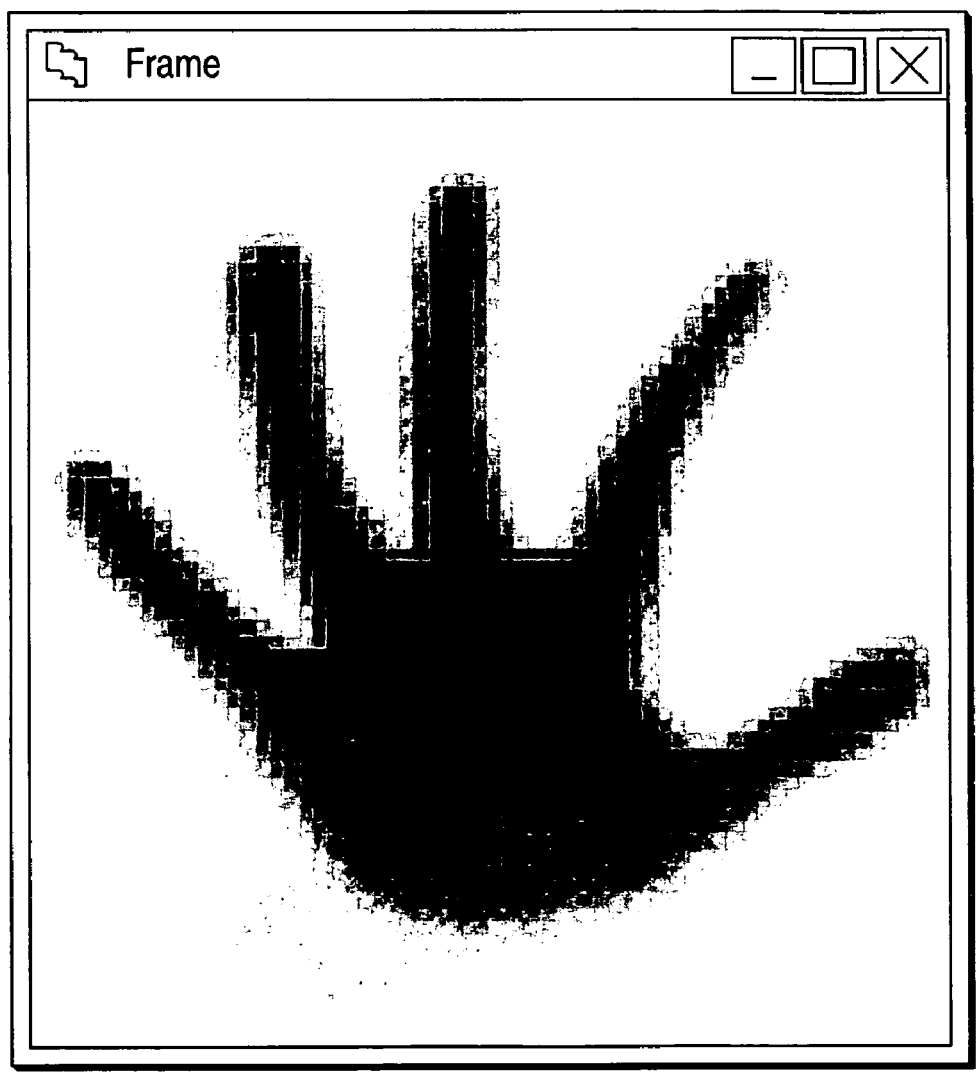
FIG. 6 shows an example of a range image.

FIG. 6 shows an example of a range image of a hand captured by the image capture section 1. The range image is a three-dimensional image having depth information, and is defined by, e.g., 64 pixels in the x-axis (horizontal) direction, 64 pixels in the y-axis (vertical) direction, and 256 gray levels in the z-axis (depth) direction. FIG. 6 expresses each distance value of a range image, i.e., tone in the z-axis direction in grayscale. In this case, as a color is closer to black, it indicates that the distance to the image capture section 1 is nearer, and as a color is closer to white, the distance is farther. When a color is perfectly white, it indicates that there is no image or it is equivalent to the absence of an image due to too far a distance even if an image is present. The intensity of light reflected by an object decreases in inverse proportion to a square of the distance to the object. That is, a pixel value Q(i, j) of each pixel (i, j) in a range image is given by:

$$Q(i, j) = K/d^2$$

where K is a coefficient which is adjusted so that a value R(i, j)="255" when d=0.5 m. By solving the above equation for d, a distance value can be obtained.

The image deformation section 2 will be explained below.

The image deformation section 2 performs a three-dimensional rotation deformation process of a range image (to be referred to as a sample image hereinafter) always several frames (e.g., one frame) before the latest image of those contained in the range image stream of the object to be recognized, which has been captured by the image capture section 1 to generate a new range image (to be referred to as a deformed image hereinafter).

Note that the range image to be used as the sample image (the number of frames before the latest image) is determined based on information such as the range image capture interval (frame rate) of the image capture section 1, the motion speed of the object, and the like. If N frames can be captured during a series of motions such as turning the hand about the y-axis, the sample image can be arbitrarily selected from range images one through N frames before the latest image.

Figure 7:
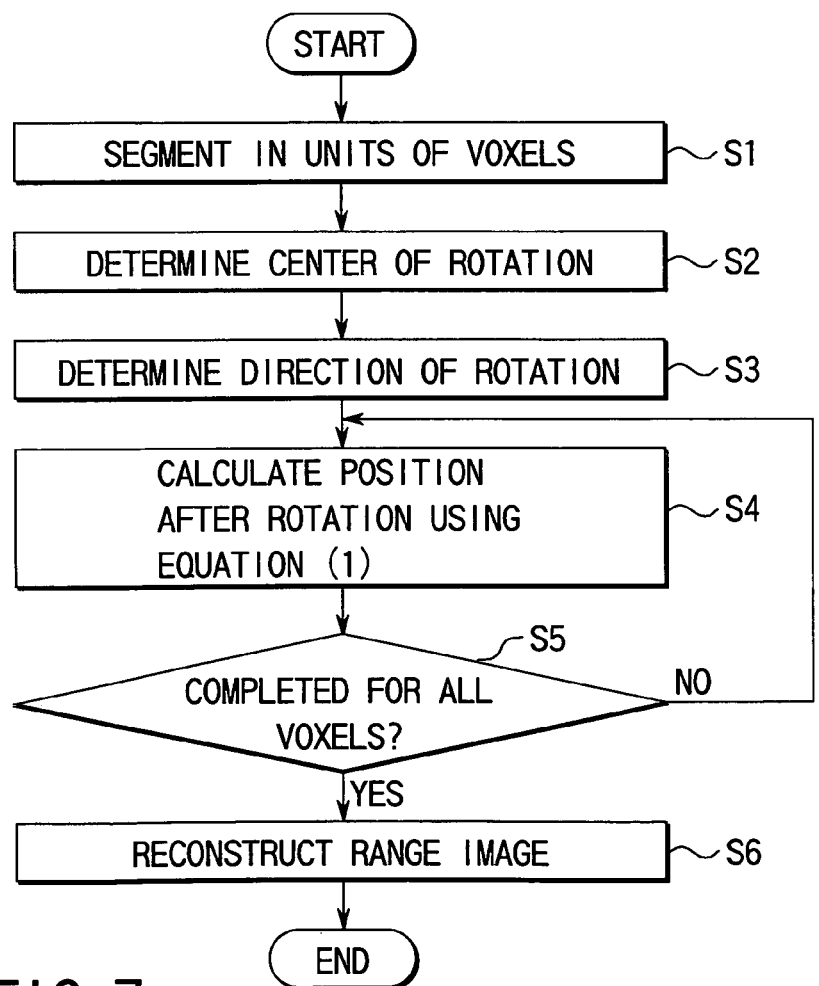
FIG. 7 is a flow chart showing the flow of a rotation deformation process of a range image.

The actual three-dimensional rotation deformation process of the image deformation section 2 for the range image will be explained in detail below. FIG. 7 is a flow chart for explaining the rotation deformation process in the image deformation section 2.

Figure 8A:
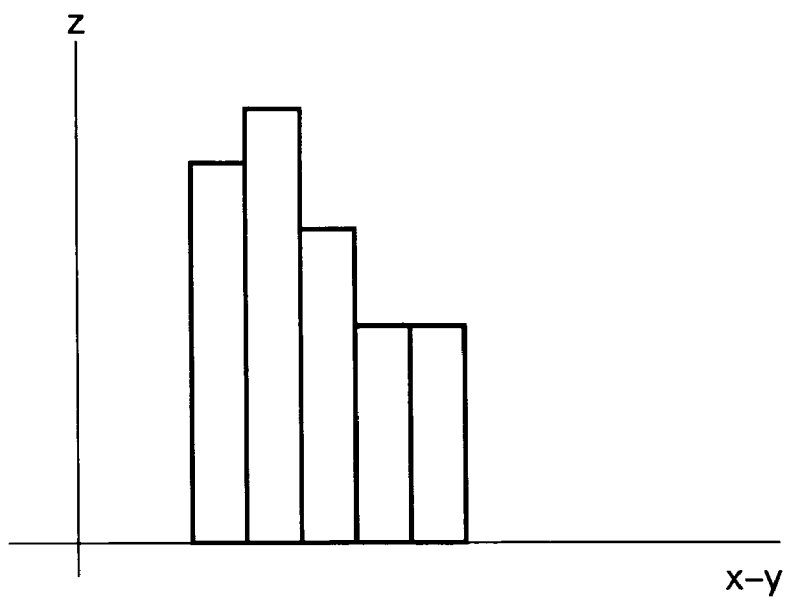
FIGS. 8A and 8B are views for explaining segmentation in units of voxels.
Figure 8B:
Figure 8B:
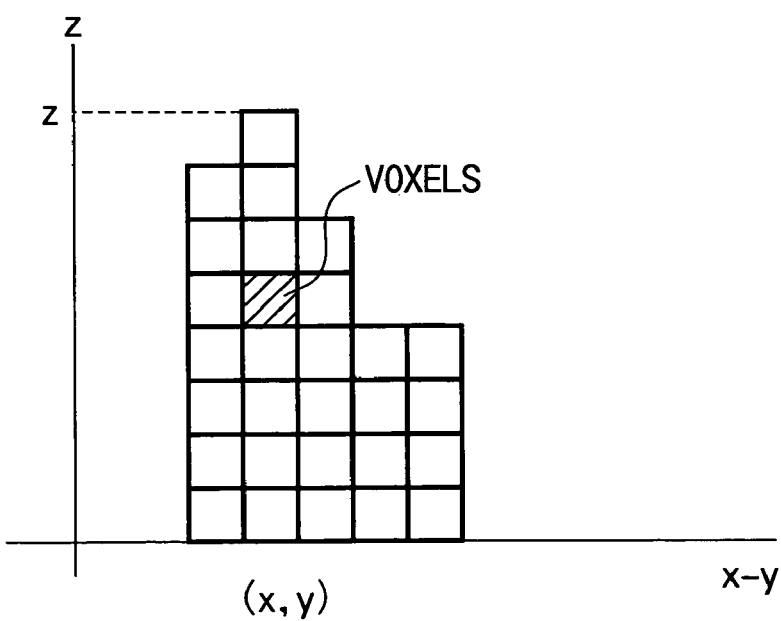

When a distance value d(x, y) at each pixel position (x, y)=z, z stacked cubes (to be referred to as voxels hereinafter) define the point, and a range image shown in FIG. 8A is segmented in units of voxels, as shown in FIG. 8B (step S1).

Figure 9A:
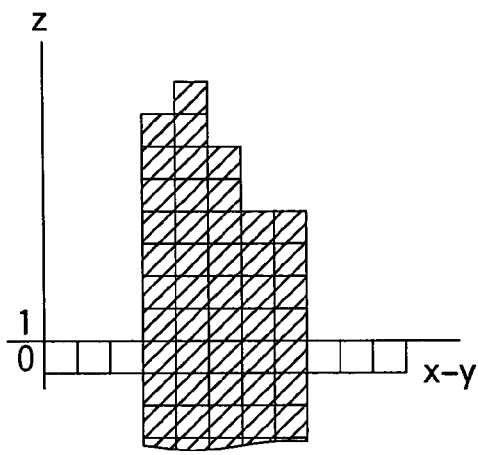
FIGS. 9A through 9D are views for explaining the segmentation method in units of voxels.
Figure 9B:
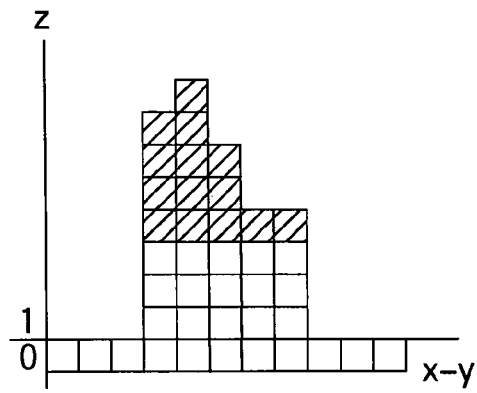
Figure 9C:
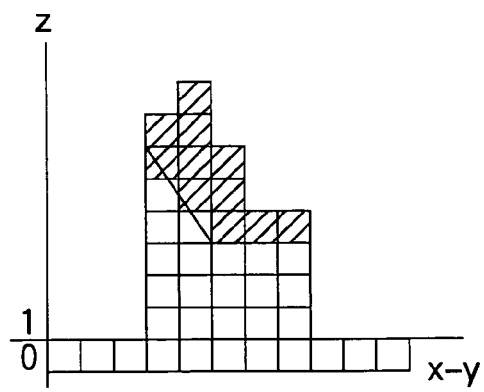
Figure 9D:
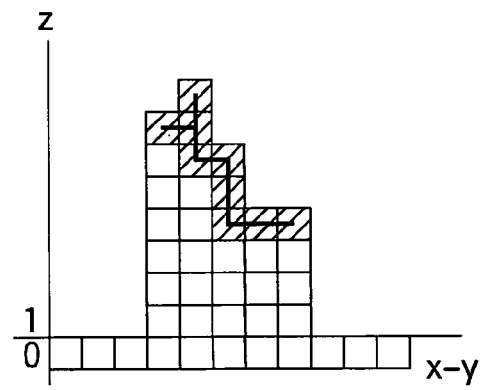

Note that the aforementioned voxel segmentation method is an example, and the voxel segmentation range of the object may be limited, as shown in FIGS. 9A through 9D. For example, voxels that are infinitely connected downward may define the point, as shown in FIG. 9A. Alternatively, absence of voxels below a given range may be assumed, as shown in FIG. 9B, or presence of voxels only in the vicinity of a surface may be assumed, as shown in FIGS. 9C and 9D.

A center (xO, yO, zO) of rotation is determined (step S2). Note that the central position of rotation can be arbitrarily determined depending on the purpose. For example, when the face is rotated, the central axis of a neck can be set at the center; when the hand is rotated, the barycentric position of the hand can be set at the center.

Furthermore, a direction (θx, θy, θz) of rotation is determined (step S3). Note that θx is the rotational angle about the x-axis, θy is that about the y-axis, and θz is that about the z-axis.

In this case, each rotational angle can be determined based on the motion speed of the object to be recognized, the range image capture interval (frame rate) of the image capture section 1, and a range image selected as the sample image (the number of frames before the latest image). For example, when rotation of the hand about the y-axis at around 30°/sec is to be captured by an image sensing device having a frame rate=1/30 sec using a range image one frame before the latest image as the sample image, since the hand is rotated 1° per frame, θy=1° can be set.

Figure 10A:
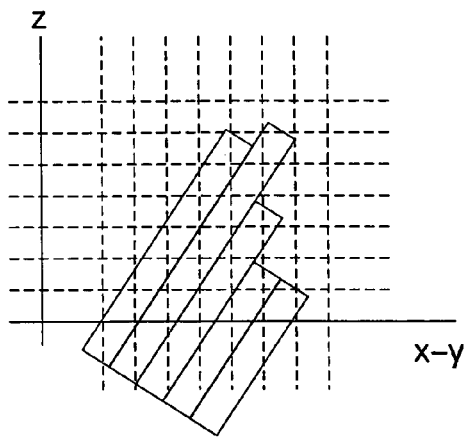
FIGS. 10A and 10B are views for explaining a rotation deformation process in units of voxels, and showing the voxel positions before and after rotation deformation.

A position (x', y', z') after rotation is computed (step S4) in units of voxels (x, y, z) shown in FIG. 10A by:

$$\begin{bmatrix} x' \\ y' \\ z' \end{bmatrix} = \begin{bmatrix} \cos\theta_z & -\sin\theta_z & 0 \\ \sin\theta_z & \cos\theta_z & 0 \\ -\sin\theta_z & 0 & 1 \end{bmatrix} \begin{bmatrix} \cos\theta_y & 0 & \sin\theta_y \\ 0 & 1 & 0 \\ -\sin\theta_y & 0 & \cos\theta_y \end{bmatrix} \begin{bmatrix} 1 & 0 & 0 \\ 0 & \cos\theta_x & -\sin\theta_x \\ 0 & \sin\theta_x & \cos\theta_x \end{bmatrix} \begin{bmatrix} x - x_0 \\ y - y_0 \\ z - z_0 \end{bmatrix} + \begin{bmatrix} x_0 \\ y_0 \\ z_0 \end{bmatrix} \quad (1)$$

$$\begin{bmatrix} x' \\ y' \\ z' \end{bmatrix} = \begin{bmatrix} \cos\theta_z & -\sin\theta_z & 0 \\ \sin\theta_z & \cos\theta_z & 0 \\ -\sin\theta_z & 0 & 1 \end{bmatrix} \begin{bmatrix} \cos\theta_y & 0 & \sin\theta_y \\ 0 & 1 & 0 \\ -\sin\theta_y & 0 & \cos\theta_y \end{bmatrix} \begin{bmatrix} 1 & 0 & 0 \\ 0 & \cos\theta_x & -\sin\theta_x \\ 0 & \sin\theta_x & \cos\theta_x \end{bmatrix} \begin{bmatrix} x - X_0 \\ y - Y_0 \\ z - Z_0 \end{bmatrix} + \begin{bmatrix} X_0 \\ Y_0 \\ Z_0 \end{bmatrix}$$

Equation (1) exemplifies a computation formula used when each voxel (x, y, z) is rotated θx, θy, and θz respectively about the x-, y-, and z-axes to have the central position (xO, yO, zO) of rotation obtained in step S2 in FIG. 7.

Note that a voxel located at a coordinate position (x, y, z) will be referred to as voxel (x, y, z).

Figure 10B:
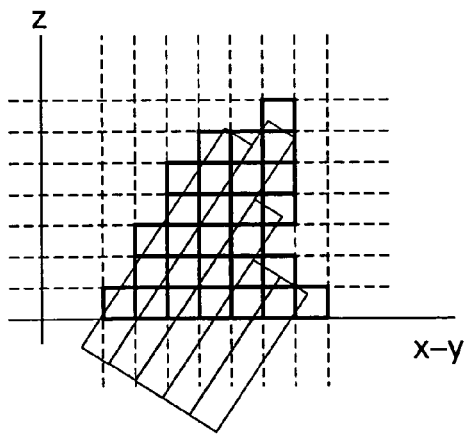
Figure 11B:
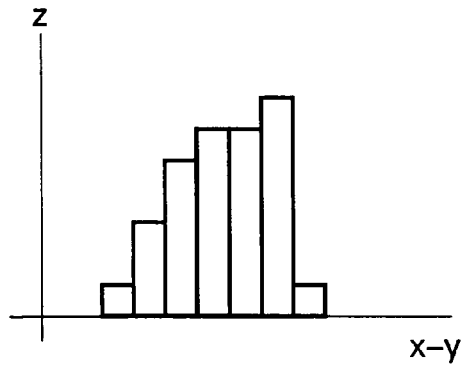

The arithmetic operation in step S4 is made for all the voxels (step S5). FIG. 10B shows the rotation result of the individual voxels.

Figure 11A:
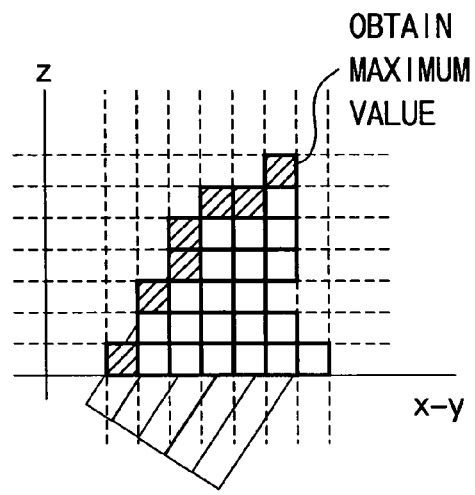
FIGS. 11A and 11B are views for explaining the way a range image is reconstructed after rotation computation.

Upon completion of the processing for all the voxels, a maximum z-value (Zmax) of a voxel (x, y, z) located at each pixel position (x, y, z) is obtained, as shown in FIG. 11A, and is used as a distance value d(x, y) of a pixel (x, y) of the deformed pixel, thus reconstructing the range image (step S6).

In the above description, the flow of voxel segmentation and the rotation deformation process by equation (1) is merely an example, and the present invention is not limited to such specific flow. A range image may undergo rotation deformation using other schemes.

With the aforementioned processes, a range image obtained by applying an arbitrary three-dimensional rotation process to the sample image, i.e., the deformed image, can be generated.

Figure 12A:
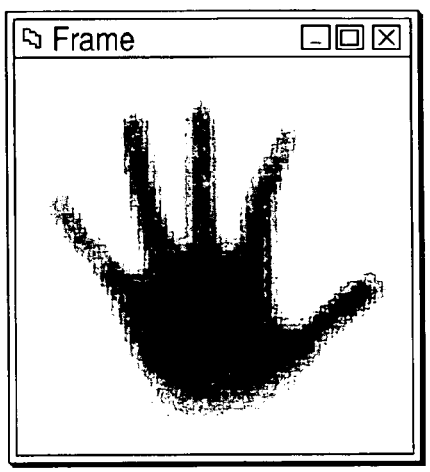
FIGS. 12A and 12B show a sample image of a hand and its deformed image.
Figure 12B:
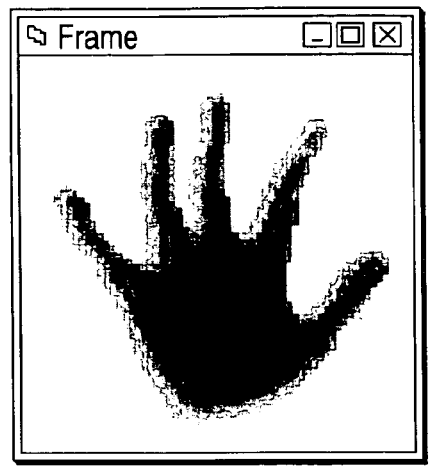

FIG. 12A shows the sample image, and FIG. 12B shows an example of the deformed image obtained by three-dimensionally rotating the sample image by the image deformation section 2. This example depicts the deformed image obtained by performing the rotation deformation process of the sample image of the hand about the y-axis (vertical direction).

The image comparison section 3 will be explained below.

The image comparison section 3 compares the latest range image (to be referred to as the latest image hereinafter) captured by the image capture section 1 with the deformed image obtained by the image deformation section 2 to check if these two images are similar to each other.

In this case, similarity is discriminated by computing correlation between the latest and deformed images. Template matching is one of such methods, and computes similarity between the image to be compared with a template image prepared in advance to check if the object to be compared is similar to the template image. In this embodiment, correlation is computed using this template matching.

More specifically, the deformed image is used as a template image, and the latest image is compared with that deformed image using template matching, thus discriminating the degree of similarity between these two images.

Figure 13A:
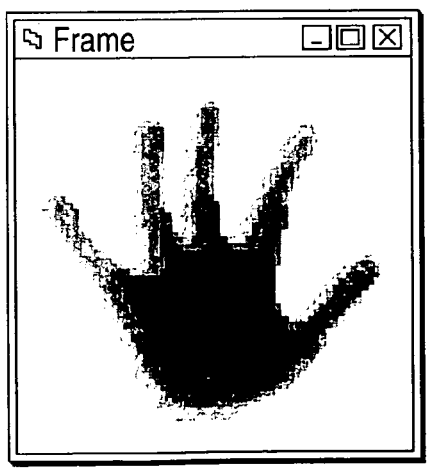
FIGS. 13A and 13B show a deformed image of the hand and its latest image.
Figure 13B:
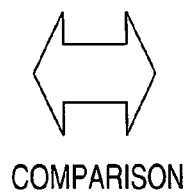
Figure 13B:
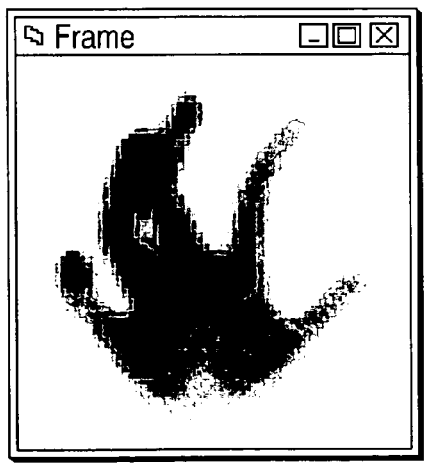

FIG. 13A shows the deformed image obtained by rotating the sample image shown in FIG. 12B, and FIG. 13B shows an example of the latest image. The degree of similarity between these deformed and latest images is discriminated.

Figure 14:
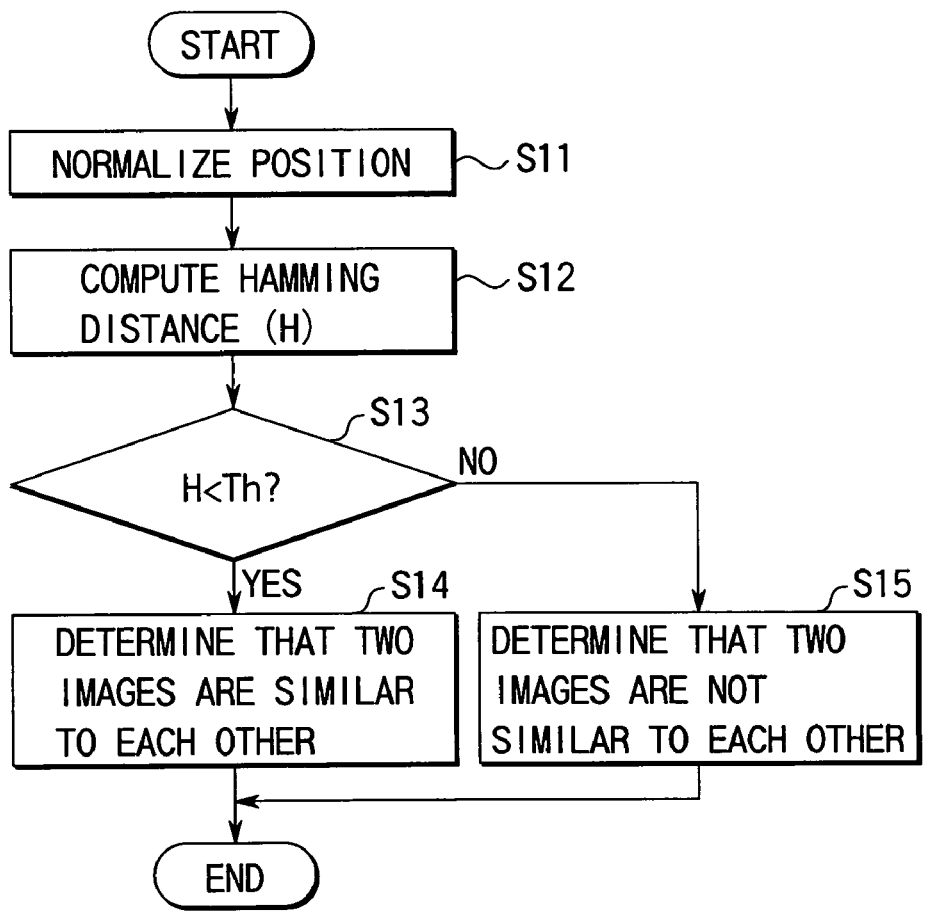
FIG. 14 is a flow chart showing the flow of a template matching process.

FIG. 14 is a flow chart for explaining the flow of the processing using template matching in the image comparison section 3. The flow of the processing will be explained below with the aid of FIG. 14.

The positions of the latest image and template image are normalized if necessary (step S11). The positions can be normalized by matching the barycentric positions of the latest and template images with each other. For this purpose, if (xc, yc, zc) represents the barycentric position of the latest image, and (xt, yt, zt) represents that of the template image, the template image can be translated by distances xc–xt, yc–yt, and zc–zt respectively in the x-, y-, and z-directions.

Note that one position normalization scheme has been explained, but the present invention is not limited to such specific position normalization method. For example, both the latest and template images may be translated to locate their barycenters at a specific position, or their positions may be normalized using keys other than the barycentric positions.

The Hamming distance between the latent and template images is then computed (step S12). The Hamming distance (H) is computed by:

$$H = \sum_i \sum_j |d(i, j) - t(i, j)| \quad (2)$$

where i and j are the x- and y-coordinates of each pixel, d(i, j) is the distance value at the coordinate position (i, j) of the latest image, and t(i, j) is the distance value at the coordinate position (i, j) of the template image.

Note that one method of computing the Hamming distance has been explained. However, the present invention is not limited to such specific Hamming distance computation method, but may use other computation formulas.

It is then checked if the Hamming distance (H) value is smaller than a predetermined threshold value (Th) (i.e., H<Th). If the computed Hamming distance is smaller than the threshold value, it is determined that the latest image is similar to the template image (steps S13 and S14).

With the aforementioned processes, it can be checked if the latest image is similar to the deformed image.

Note that this embodiment has exemplified the method of computing similarity between the latest and template images by obtaining the Hamming distance therebetween. However, the present invention is not limited to this method, but may use other computation methods such as a method using a computation of distance having a different definition from the Hamming distance, and the like.

Also, this embodiment has exemplified the method of computing correlation using template matching. However, the present invention is not limited to such specific correlation computation method, but may use various other possible choices such as a method using DP matching, KL transformation, or the like, a method of computing the Fourier-transforms of the two images, and analyzing correlation between the images after Fourier transformation, and the like.

As described above, according to this embodiment, whether or not an image obtained by rotating an image several frames (e.g., one frame) before the latest image is similar to the latest image can be detected. That is, whether or not the object has rotated between a timing several frames before the current timing, and the current timing can be recognized.

Furthermore, in this embodiment, the range is actually three-dimensionally rotated, and recognition is done using that three-dimensional information, unlike the conventional recognition method for estimating three-dimensional rotation from two-dimensional information in a two-dimensional image (e.g., rotation of the hand about the y-axis is estimated because the projection area of the hand in the x-axis direction (horizontal direction) decreases). For this reason, recognition can be done more reliably and stably than the conventional method.

In conventional recognition using template matching, a large number of template images must be prepared in advance. However, in the method of this embodiment, since the deformed image is generated in real time, and is used as a template image, no template image need be prepared in advance, and memory resources or the like can be prevented from being wasted, thus allowing efficient processing.

Also, in conventional recognition using template matching, since it is impossible to prepare every kinds of template images in practice, some template images having representative shapes of objects to be recognized are normally prepared. For example, in case of face recognition, faces of male and female adults, children, aged persons, and the like for several persons are prepared. At this time, since a representative shape is used as a template image to be compared, it is often different from the current object to be recognized in details, and such difference is one factor that lowers similarity. When recognition is done for unspecified objects, the recognition rate cannot be improved unless a largest possible number of template images must be prepared. However, since the method of this embodiment generates a template image by deforming the object to be recognized itself, such problem can be solved.

To restate, according to this embodiment, since a range image several frames before the latest image of the object to be recognized undergoes three-dimensional rotation deformation in real time, and the image obtained by deformation is compared with the current range image, three-dimensional rotation of the object can be stably recognized in real time.

This embodiment is not limited to the aforementioned arrangement, and various modifications of this embodiment may be made. Some modifications of this embodiment will be explained below.

(First Modification of First Embodiment)

The image capture section 1 may capture range images at specific timings (e.g., a user instruction or the like) in place of predetermined time intervals.

In this manner, three-dimensional rotation at arbitrary time intervals can be recognized. For example, the user instructs the start and end timings using a switch to detect whether or not rotation has taken place during that interval.

For example, vehicles must be equipped with airbags to relax collision shocks upon accident. Upon inflating an airbag, the direction and position of the face of a passenger at the front passenger seat must be detected to prevent the passenger from being excessively pressed by the airbag. At this time, when a person sits at a seat and fastens a seatbelt, a range image of the face of the passenger at the front passenger seat is captured, and a deformed image is obtained using the captured image as a sample image. Then, a range image of the face immediately before inflation of the airbag is captured, and is compared with the deformed image, thus recognizing the position and direction of the face of the passenger with high precision.

(Second Modification of First Embodiment)

The image deformation section 2 may generate a deformed image by the three-dimensional rotation deformation process of a range image several frames (e.g., one frame) before a range image of a specific past frame in place of the latest image, and the image comparison section 3 may compare the range image of the frame used as the reference image in the image deformation section 2 with the deformed image obtained by the image deformation section 2 to check if these two images are similar to each other.

In this manner, three-dimensional rotation at a specific past timing can be recognized.

(Third Modification of First Embodiment)

The image deformation section 2 and image comparison section 3 may be modified as follows.

A new image deformation section 2 performs a plurality of three-dimensional rotation deformation processes having different deformation parameters for the sample image to generate a plurality of deformed images.

A new image comparison section 3 compares the latest image captured by the image capture section 1 with the plurality of deformed images with different deformation parameters obtained by the new image deformation section 2 to check if the deformed images include those similar to the latest image. If such images are found, one deformed image having highest similarity with the latest image is detected.

An example of the processes in the new image deformation section 2 of this modification will be explained below.

Figure 15:
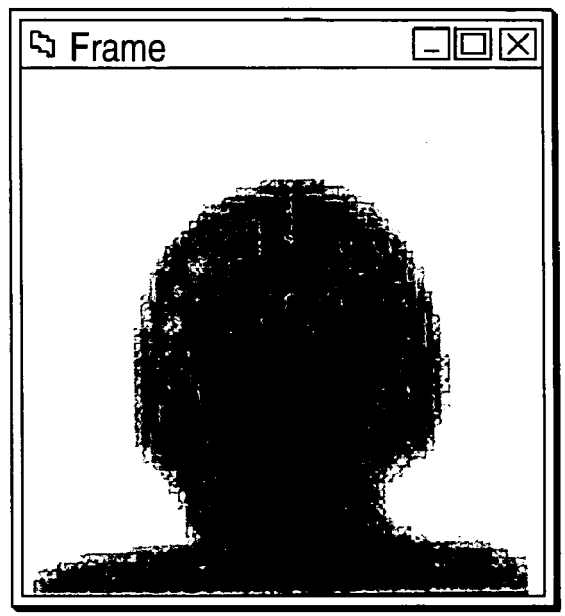
FIG. 15 shows a sample image of a face.

Assume that the range image of the face of a person shown in, e.g., FIG. 15 is captured as a sample image.

Figure 16:
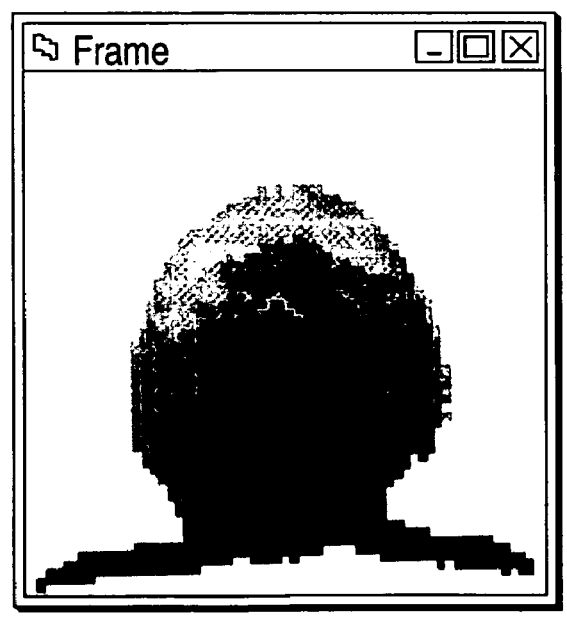
FIG. 16 shows a deformed image which is generated from the sample image shown in FIG. 15, and the face of which is turned slightly upward by rotating the sample image by $(\theta x, \theta y, \theta z)=(2, 0, 0)$ about the barycentric position of the head as the center.
Figure 17:
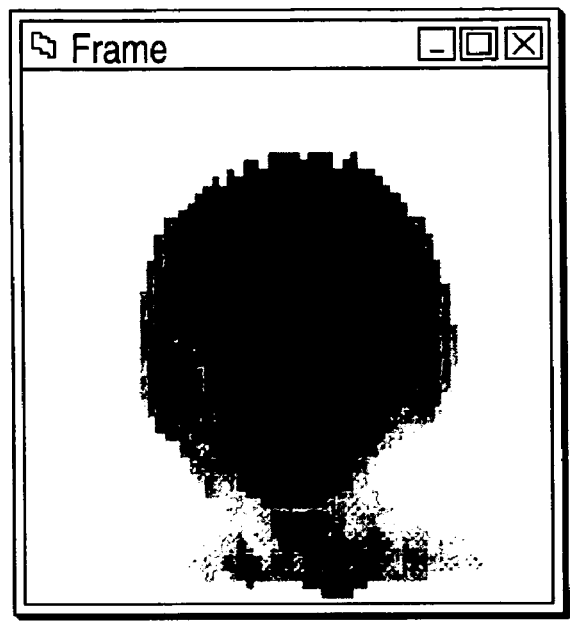
FIG. 17 shows a deformed image which is generated from the sample image shown in FIG. 15, and the face of which is turned slightly downward by rotating the sample image by $(\theta x, \theta y, \theta z)=(-2, 0, 0)$ about the barycentric position of the head as the center.
Figure 18:
FIG. 18 shows a deformed image which is generated from the sample image shown in FIG. 15, and the face of which is turned slightly rightward on the plane of paper by rotating the sample image by $(\theta x, \theta y, \theta z)=(0, 2, 0)$ about the barycentric position of the head as the center.
Figure 19:
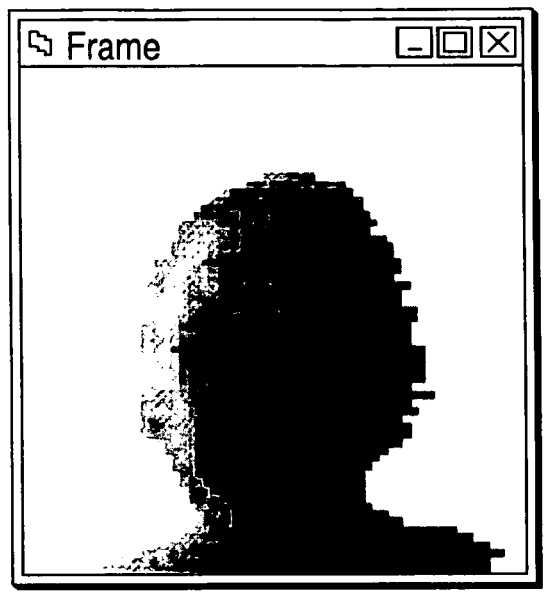
FIG. 19 shows a deformed image which is generated from the sample image shown in FIG. 15, and the face of which is turned slightly leftward on the plane of paper by rotating the sample image by $(\theta x, \theta y, \theta z)=(0, -2, 0)$ about the barycentric position of the head as the center.

Four deformed images are generated by rotating this sample image of the face through an identical angle respectively in the up, down, right, and left directions, as shown in FIGS. 16 through 19. FIG. 16 shows a deformed image obtained by rotating the sample image through $(\theta x, \theta y, \theta z)=(2, 0, 0)$ to have the barycentric position of the head as the center to turn the face slightly upward. Also, FIG. 17 shows a deformed image obtained by rotating the sample image through $(\theta x, \theta y, \theta z)=(-2, 0, 0)$ to have the barycentric position of the head as the center to turn the face slightly downward. Likewise, FIG. 18 shows a deformed image obtained by rotating the sample image through $(\theta x, \theta y, \theta z)=(0, 2, 0)$ to have the barycentric position of the head as the center to turn the face slightly rightward on the plane of paper. Furthermore, FIG. 19 shows a deformed image obtained by rotating the sample image through $(\theta x, \theta y, \theta z)=(0, -2, 0)$ to have the barycentric position of the head as the center to turn the face slightly leftward on the plane of paper. Note that the unit of angle is "degree".

In FIGS. 16 through 19, since the sample image is rotated in the respective directions, the color of a portion deformed in a direction to approach the image capture section 1 becomes closer to black, and that of a portion deformed in a direction to be farther from the unit 1 becomes closer to white.

Figure 20:
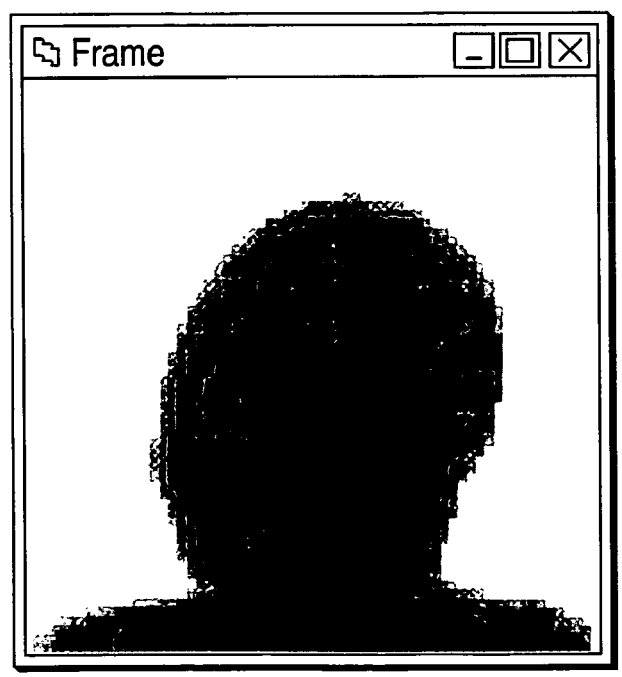
FIG. 20 shows the latest image of the face to be compared with the deformed images shown in FIGS. 16 through 19.

Using all the four deformed images shown in FIGS. 16 through 19 obtained by the image deformation section 2, the image comparison section 3 makes template matching with the latest image shown in FIG. 20 to check if the four deformed images include ones similar to the latest image, and to detect the deformed image with highest similarity if such images are found.

Figure 21:
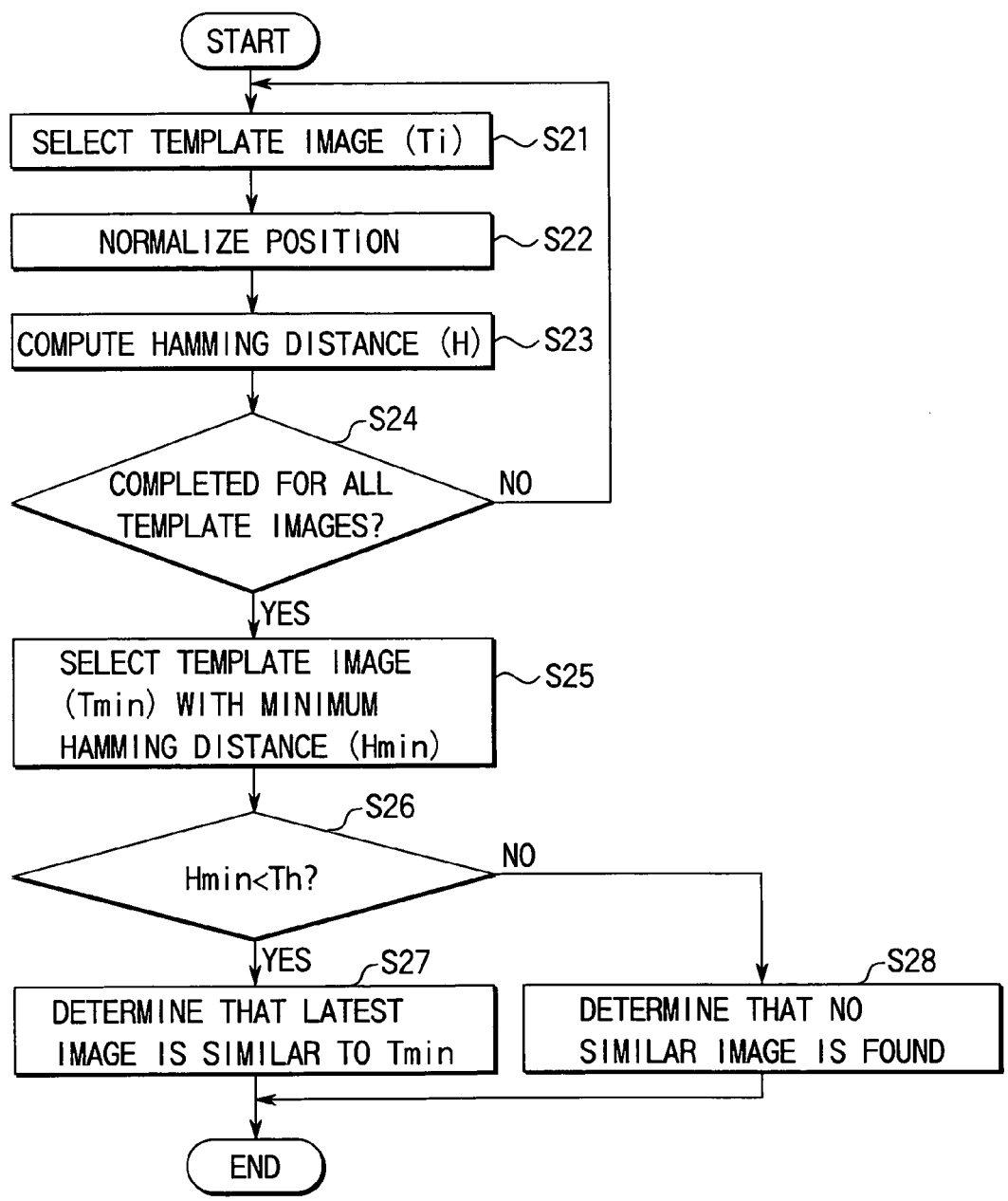
FIG. 21 is a flow chart showing the flow of a template matching process.

FIG. 21 is a flow chart for explaining the flow of the processing using template matching in the new image comparison section 3. The flow of the processing will be explained below with reference to FIG. 21.

One template image (Ti) is selected (step S21). That is, Ti is one of the four deformed images shown in FIGS. 16 through 19.

The positions of the selected image and latest image are normalized if necessary (step S22) as in the description of FIG. 14.

The Hamming distance between the latest image and template image (Ti) is computed (step S23) as in the description of FIG. 14.

It is checked if the Hamming distances have been computed for all the template images (step S24). If the Hamming distances to be computed still remain, the flow returns to step S21. Upon completion of computations for all the template images, a template image (Tmin) that yields the minimum Hamming distance (Hmin) is selected (step S25). In this case, assume that the deformed image shown in, e.g., FIG. 16 is selected.

It is checked if this Hamming distance (Hmin) value is smaller than a predetermined threshold value (Th) (i.e., Hmin<Th) (step S26). If the Hamming distance is smaller than the threshold value, it is determined that the latest image is similar to the template image (Ti) (step S27). If this condition is satisfied, it is determined that the deformed image shown in FIG. 16 is similar to the latest image.

With the aforementioned processes, a deformed image having highest similarity to the latest image can be detected. (A result that indicates the absence of any similar deformed image may be obtained (step S28).)

In this manner, since it is determined that the latest image shown in FIG. 20 is similar to the deformed image that turned the face rightward shown in FIG. 16, it is recognized that "the person to be recognized has turned his or her face rightward".

As described above, in this modification, the direction of rotation (in which direction the object has rotated) of the object to be recognized can be recognized.

Note that this modification has exemplified the method of generating deformed images in the four, up, down, right, and left directions. However, this method is an example of a plurality of three-dimensional rotation deformation processes with different deformation parameters, and the present invention is not limited to this method, but can freely select directions to be rotated in correspondence with the purposes of recognition. For example, the number of directions to be rotated may be increased to eight, i.e., up, down, right, left, upper right, upper left, lower right, and lower left directions, the number of directions only on, e.g., the right side may be increased to mainly check that side, identical directions to be rotated having different rotational angles may be prepared, and so forth.

Figure 22:
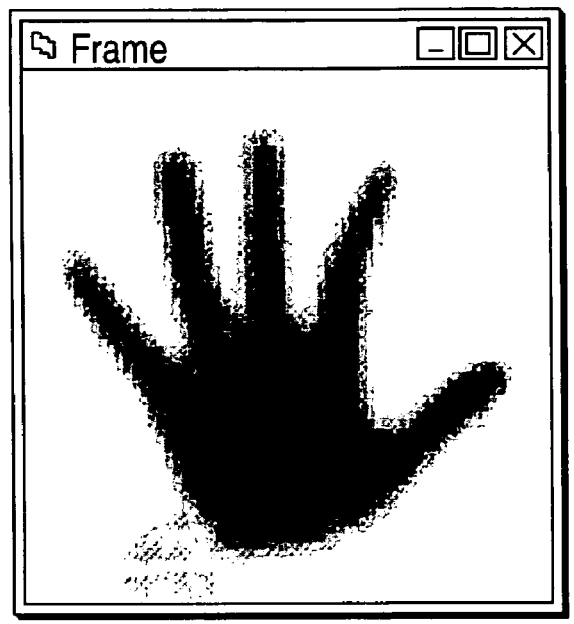
FIG. 22 shows a sample image of a hand.
Figure 23:
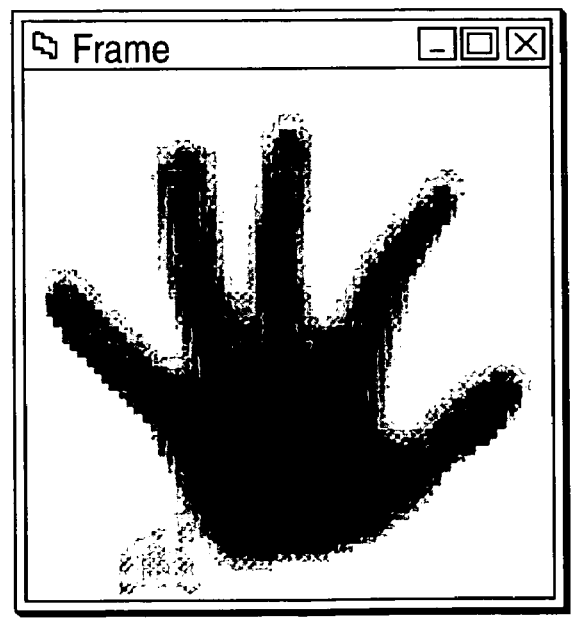
FIG. 23 shows a deformed image which is generated from the sample image shown in FIG. 22, and is turned slightly upward by rotating the sample image about the barycentric position of the hand.
Figure 24:
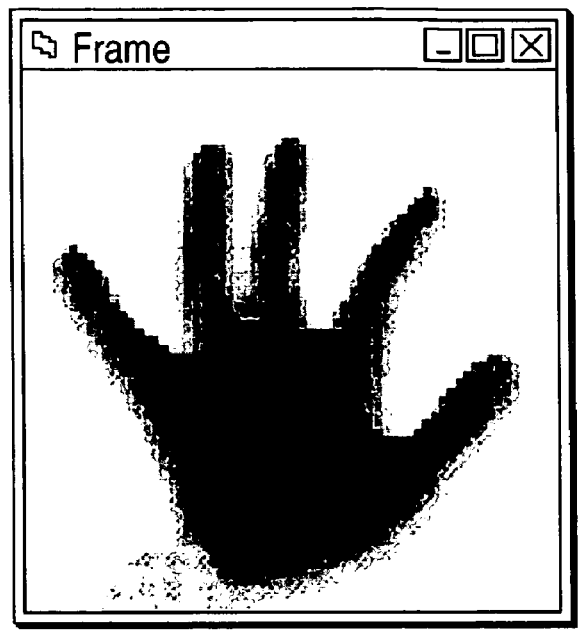
FIG. 24 shows a deformed image which is generated from the sample image shown in FIG. 22, and is turned slightly downward by rotating the sample image about the barycentric position of the hand.
Figure 25:
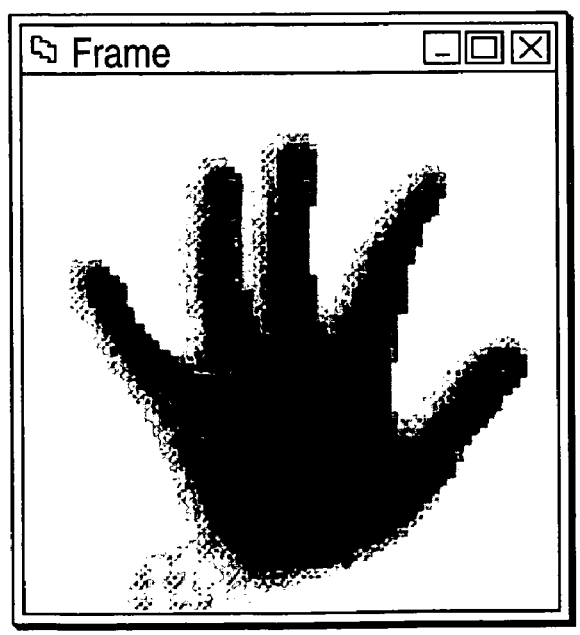
FIG. 25 shows a deformed image which is generated from the sample image shown in FIG. 22, and is turned slightly rightward on the plane of paper by rotating the sample image about the barycentric position of the hand.

For example, rotation of the hand will be examined. In place of generating deformed images shown in FIGS. 23 through 26 by rotating a sample image shown in FIG. 22 in the four, i.e., up, down, right, and left directions to have the barycentric position of the hand as the center, a plurality of deformed images having different rotational angles (two angles, i.e., 1° and 2° in this example) in each of the up, down, right, and left directions may be generated, as shown in FIGS. 27A through 30B.

Figure 28A:
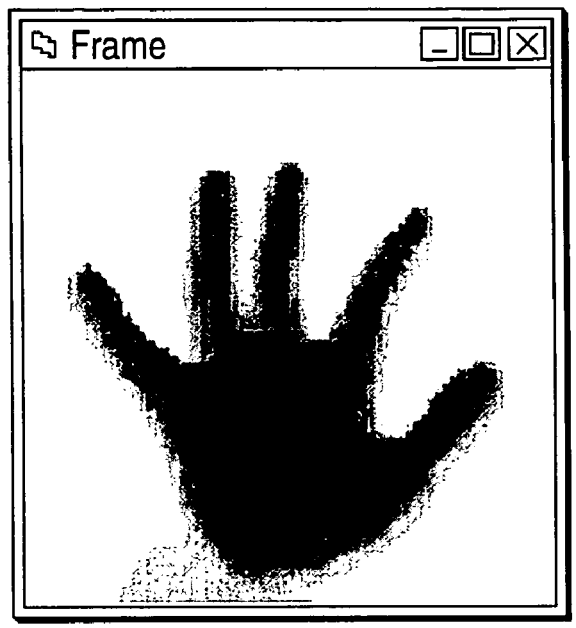
FIGS. 28A and 28B show two deformed images which are generated from the sample image shown in FIG. 22, and which are turned slightly downward by rotating the sample image about the barycentric position of the hand.
Figure 28B:
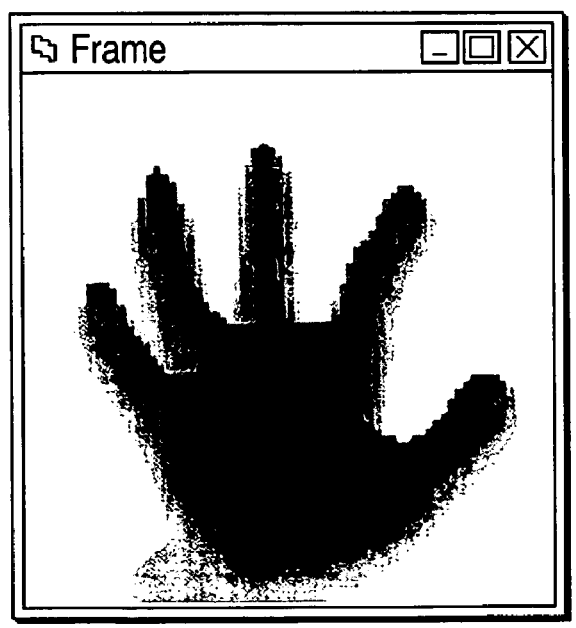
Figure 29A:
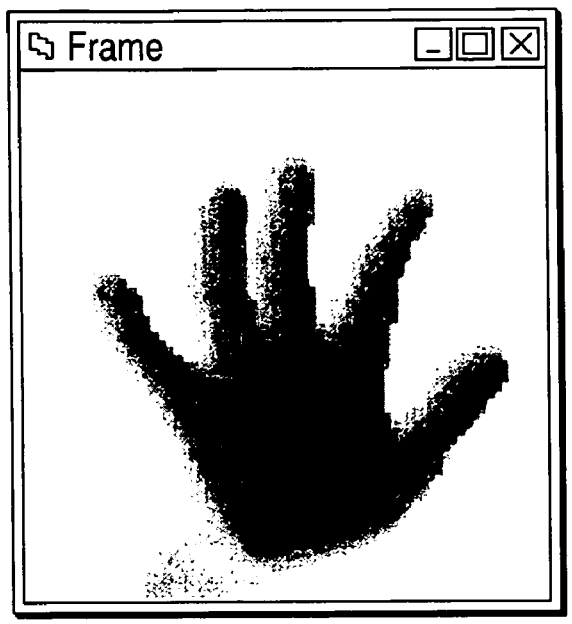
FIGS. 29A and 29B show two deformed images which are generated from the sample image shown in FIG. 22, and which are turned slightly rightward on the plane of paper by rotating the sample image through different angles about the barycentric position of the hand.
Figure 29B:
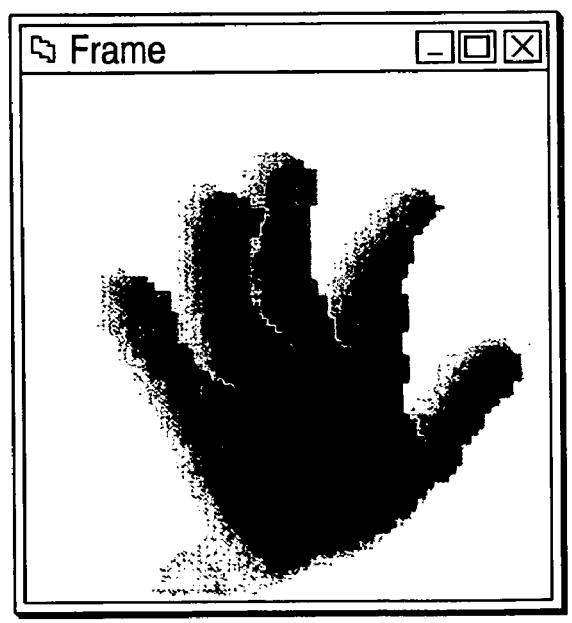
Figure 30A:
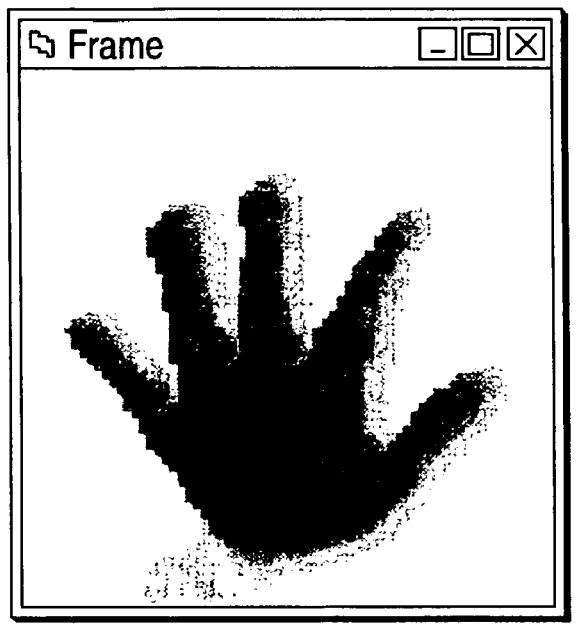
FIGS. 30A and 30B show two deformed images which are generated from the sample image shown in FIG. 22, and which are turned slightly leftward on the plane of paper by rotating the sample image through different angles about the barycentric position of the hand.
Figure 30B:
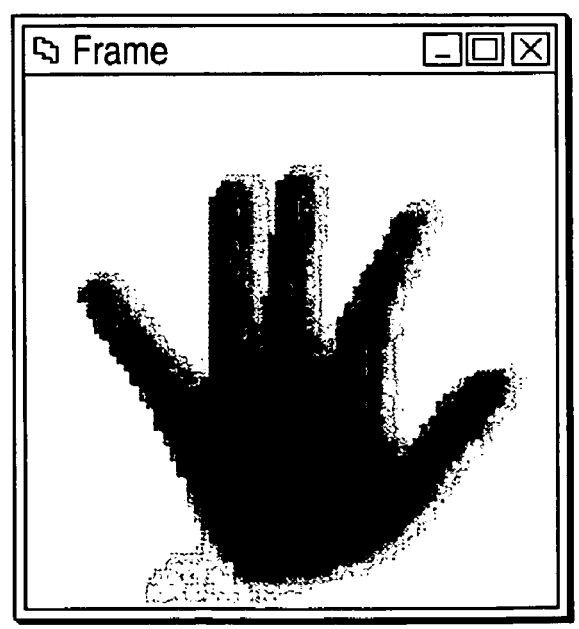

FIG. 27A shows a deformed image generated by rotating the sample image through $(\theta x, \theta y, \theta z)=(1, 0, 0)$ to turn the hand slightly upward, and FIG. 27B shows a deformed image generated by rotating the sample image through another degree, i.e., $(\theta x, \theta y, \theta z)=(2, 0, 0)$ to turn the hand further upward. FIG. 28A shows a deformed image generated by rotating the sample image through $(\theta x, \theta y, \theta z)=(-1, 0, 0)$ to turn the hand slightly downward, and FIG. 28B shows a deformed image generated by rotating the sample image through another degree, i.e., $(\theta x, \theta y, \theta z)=(-2, 0, 0)$ to turn the hand further downward. FIG. 29A shows a deformed image generated by rotating the sample image through $(\theta x, \theta y, \theta z)=(0, 1, 0)$ to turn the hand slightly rightward on the plane of paper, and FIG. 29B shows a deformed image generated by rotating the sample image through another degree, i.e., $(\theta x, \theta y, \theta z)=(0, 2, 0)$ to turn the hand further rightward. FIG. 30A shows a deformed image generated by rotating the sample image through $(\theta x, \theta y, \theta z)=(0, -1, 0)$ to turn the hand slightly leftward on the plane of paper, and FIG. 30B shows a deformed image generated by rotating the sample image through another degree, i.e., $(\theta x, \theta y, \theta z)=(0, -2, 0)$ to turn the hand further leftward.

In this manner, since a plurality of deformed images having different rotational angles (two angles, i.e., 1° and 2° in this example) in each of the up, down, right, and left directions are prepared, not only the direction of rotation of the object to be recognized but also the rotation amount can be recognized.

At this time, if the range image capture frame rate remains the same, since the rotation amount is proportional to the motion speed, both the motion direction and speed can be recognized at the same time.

That is, not only the motion of the object, i.e., which side a person has turned his or her hand, is recognized but also that motion speed can be obtained at the same time.

(Fourth Modification of First Embodiment)

The image deformation section 2 of the first embodiment generates a deformed image by a three-dimensional rotation deformation process. Also, a range image that has not undergone any deformation, i.e., a sample image itself may be directly used as the deformed image.

In this case, whether or not the object to be recognized stands still can be recognized.

(Fifth Modification of First Embodiment)

The image deformation section 2 of the first embodiment generates a deformed image by the three-dimensional rotation deformation process, but may generate a deformed image by a translation deformation process.

In this case, three-dimensional translation of the object to be recognized can be recognized.

The translation deformation process has been exemplified as one scheme of deformation means in the image deformation section 2. However, the present invention is not limited to such specific deformation means, but can use various other deformation means such as enlargement/reduction, reversal (mirroring), trimming, and the like.

In this manner, motions that are associated with arbitrary deformations such as three-dimensional enlargement/reduction and the like of the object to be recognized can be recognized.

Furthermore, when the image deformation section 2 performs a combination of these deformation processes, not only single motion such as rotation, translation, or the like but also arbitrary motions can be recognized.

For example, when a deformed image is generated by combining "translation deformation of the hand image in the z-axis (depth) direction" and "rotation about the y-axis (vertical direction)", a combination of back-and-forth motion in the depth direction and right-and-left rotation about the vertical axis of the hand can be recognized.

(Second Embodiment)

The second embodiment of the present invention will be described below.

Figure 31:
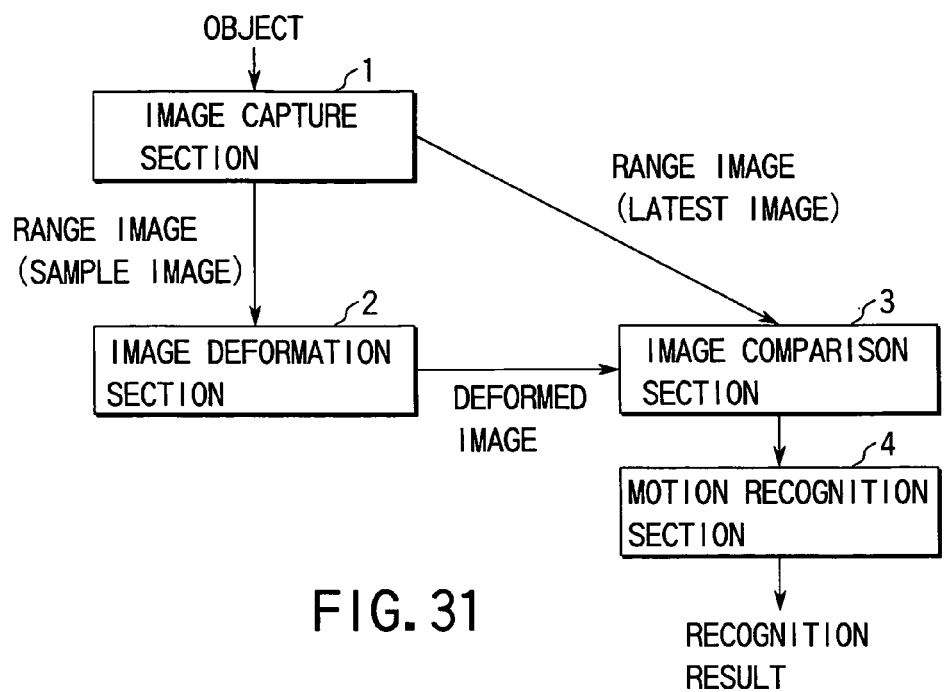
FIG. 31 is a schematic block diagram showing an example of the arrangement of an image recognition apparatus according to the second embodiment of the present invention.

FIG. 31 is a block diagram showing the overall arrangement of an image recognition apparatus according to the second embodiment of the present invention.

The image recognition apparatus of this embodiment comprises a motion recognition section 4 for implementing motion recognition using the comparison result in the image comparison section 3 in addition to the arrangement of the image recognition apparatus of the first embodiment.

The motion recognition section 4 will be explained below.

Using the image recognition apparatus according to the first embodiment, whether or not rotation has taken place between a timing of the latest frame and a timing several frames before can be discriminated. Since the image capture section 1 in the first embodiment sequentially captures range images at predetermined intervals, one of two choices "rotated" and "not rotated" is obtained in turn as a recognition result by repeating discrimination of rotation every time the latest frame is obtained.

The motion recognition section 4 recognizes motion, i.e., what meaning the detected rotation has, using a sequence of discrimination results indicating whether or not rotation has taken place, which are sequentially obtained by the image comparison section 3.

Since the image comparison section 3 sequentially obtains discrimination results each indicating whether or not rotation has taken place at the latest frame, the number of times motion has occurred within an arbitrary time interval can be detected by counting a total number of rotations that occurred within that time interval.

With this technology, even a person, who cannot talk owing to some disease, accident, or the like and can only move hands, can explicitly reveal his or her will; e.g., "Yes" when he or she turns the hand once, "No" when twice, "Want to do something" when three times, and so on. Conventionally, when a patient in a sick room has some abnormal situation, he or she calls a nurse or doctor by a button type buzzer at his or her bedside and talks to the nurse or doctor via an interphone to give the information needed. However, when a patient cannot talk, mutual understanding can hardly be achieved until the nurse or doctor reaches the sick room. In such case, when the image recognition apparatus of the present invention is used in place of the buzzer or interphone, mutual understanding can be achieved even when the doctor or nurse is not present at that place.

Furthermore, the image recognition apparatus of this embodiment can obtain a pattern of motions indicating that, e.g., rotation was "done, done, not done, done, not done, . . ." within a specific period of time.

In this manner, when the image recognition apparatus of this embodiment is connected to, e.g., a personal computer (PC), if actions to be taken in response to predetermined motion patterns are determined in advance, the PC can be operated by user's hand actions. For example, when a motion pattern indicating that rotation was "not done, not done, done" is obtained, wordprocessing software is launched; when a motion pattern indicating that rotation was "not done, done, done" is obtained, spreadsheet software is launched, and so forth. Likewise, hand actions can operate various devices. For example, home electronic apparatuses such as a TV, video player, and the like can be operated by hand actions; the power switch is turned on upon detecting a given pattern, the tone volume is increased/decreased upon detecting another pattern, and so on. Also, a game machine can be operated by hand actions to change character motions depending on patterns.

For example, when the image comparison section 3 counts the number of rotations of the hand within an arbitrary time interval, the motion recognition section 4 has a table that stores the meanings (types) of motions such as "Yes" when the user turns the hand once, "No" when twice, "Want to do something" when three times, and so on. The motion recognition section 4 looks up this table to recognize and output the type of motion corresponding to the number of motions (e.g., hand rotations) obtained from the recognition result in the image comparison section 3.

For example, when the image comparison section 3 recognizes whether rotation is "done" or "not done", the motion recognition section 4 has a table for pre-storing types of actions such as "to launch wordprocessing software" in response to a pattern of a series of motions indicating that rotation was "not done, not done, done", and "to launch spreadsheet software" in response to a pattern of a series of motions indicating that rotation was "not done, done, done". The motion recognition section 4 looks up this table to recognize and output the type of action corresponding to a predetermined pattern of a series of motions obtained from the recognition result of the image comparison section 3.

(First Modification of Second Embodiment)

When the motion recognition section 4 is added to the image recognition apparatus described in the third modification of the first embodiment, the motion recognition section 4 can detect a series of motions.

For example, when images of the face are sensed, and a person makes a series of motions such as "turns the face rightward", "does not turn the face (stands still)", "turns the face leftward", "does not turn the face", "turns the face rightward", . . . , it can be recognized that the person is shaking the head horizontally (saying "No").

(Second Modification of Second Embodiment)

When the motion recognition section 4 is added to the fifth modification of the first embodiment, a series of motions such as "translation to the right", "rotation about the vertical axis", "movement in the depth direction", and the like of, e.g., the hand can be recognized.

In this manner, unique motions that only a given person knows are registered in a personal authentication apparatus such as an auto-locking apparatus of a door, an ATM apparatus in a bank, or the like, and whether or not the person is authentic can be detected by checking if motions of the person in the authentication process of that apparatus matches the registered ones. In this manner, the image recognition apparatus of this embodiment can be used in personal authentication.

Furthermore, since individual deformation parameters upon deformation in the image deformation section 2 are known in advance, arbitrary motion can be formulated into equations by holding all these parameters.

Human motions are ambiguous unlike those of machines, and it is conventionally difficult to describe them by formulas using parameters such as the center of rotation, rotational angle, and the like. However, according to this modification, human motions can be clearly formulated into equations.

(Third Embodiment)

The third embodiment of the present invention will be explained below.

Figure 32:
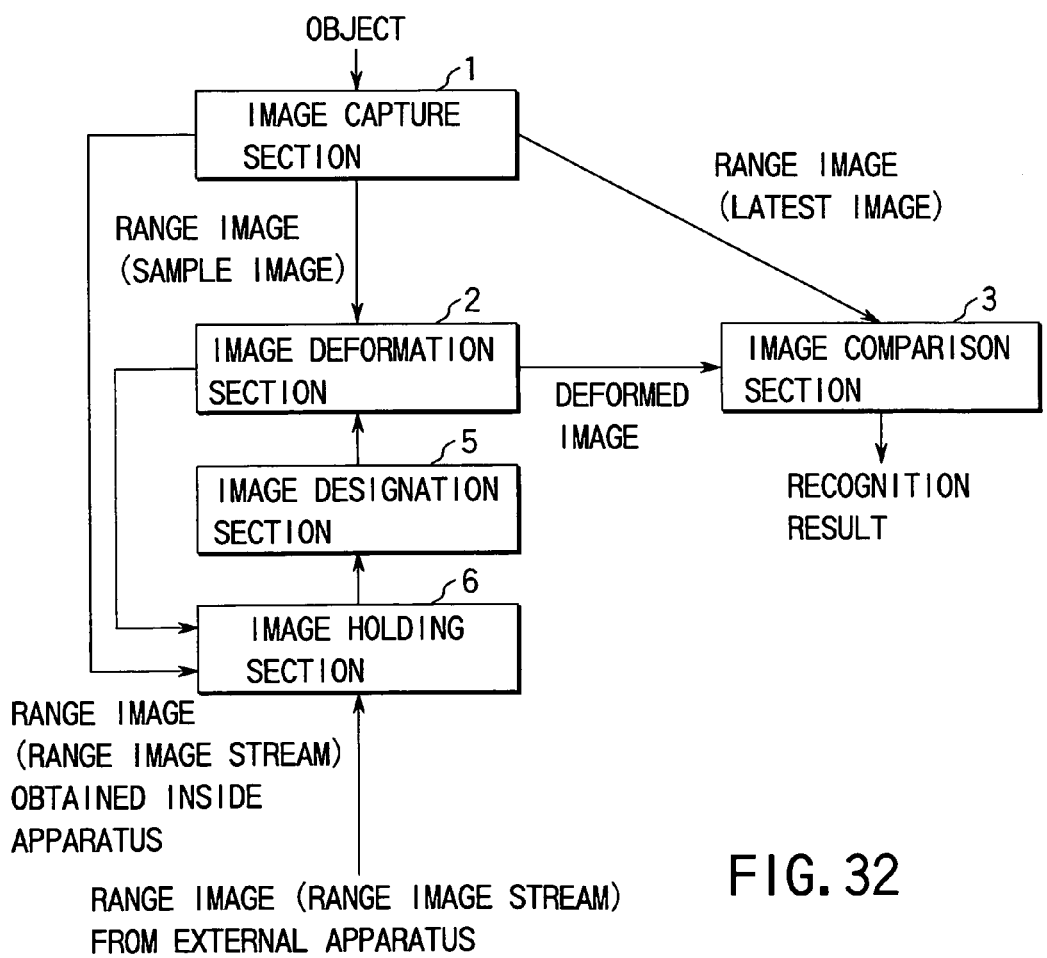
FIG. 32 is a schematic block diagram showing an example of the arrangement of an image recognition apparatus according to the third embodiment of the present invention.

FIG. 32 is a block diagram showing the overall arrangement of an image recognition apparatus according to the third embodiment of the present invention.

The image recognition apparatus of this embodiment comprises an image holding section 6 for holding range images or range image streams (a plurality of time-serially continuous range images captured at given time intervals), and an image designation section 5 for extracting an arbitrary range image or range image stream from those held in the image holding section 5, in addition to the arrangement of the image recognition apparatus of the first embodiment.

The image holding section 6 will be explained first.

The image holding section 6 holds range images or range image streams captured inside or outside the image recognition apparatus of this embodiment. As a holding method, for example, a range image or range image stream to be held is stored in a hard disk, silicon disk, memory, or the like as one or a plurality of files.

Note that the aforementioned holding method is merely an example, and the present invention is not limited to such specific method. Arbitrary holding methods can be used. Also, two or more holding methods can be used at the same time.

The holding location is not always one. Files may be divisionally held in a plurality of hard disks or may be distributed and held in hard disks in PCs, which are located at physically different places (e.g., Tokyo and New York), via a network.

Furthermore, the image holding section 6 can hold arbitrary range images or range image streams generated by an external apparatus, range images or range image streams captured by the image capture section 1, range images deformed by the image deformation section 2, and the like at arbitrary timings.

The image designation section 5 will be described below.

The image designation section 5 extracts an arbitrary range image or range image stream held in the image holding section 6, and passes it to the image deformation section 2.

The image designation section 5 can also extract only some range images in a range image stream. For example, when a range image stream consists of 10 frames, the image designation section 5 can extract only five frames (e.g., the third to seventh frames), and can pass them as a range image stream consisting of five frames. Also, the image designation section 5 can pass an arbitrary range image in a range image stream.

In this case, the image deformation section 2 generates a deformed image using a range image extracted by the image designation section 5 as a sample image in place of that captured by the image capture section 1.

In this manner, according to this embodiment, recognition can be made using deformed images of pre-stored range images as template images unlike in the first embodiment.

That is, when range images to be used in recognition of a given motion are registered in advance in the image holding section 6, whether or not that motion has taken place can be recognized.

(First Modification of Third Embodiment)

The third embodiment may further comprise the motion recognition section 4 that has been explained in the second embodiment.

In this case, an image recognition apparatus which can obtain the effects of the second embodiment in addition to those of this embodiment can be constructed.

(Second Modification of the Third Embodiment)

In this embodiment, a range image or range image stream extracted by the image designation section 5 is input to the image deformation section 2 to generate a deformed image, and the generated deformed image is used as an image to be compared (template image) in the image comparison section 3. Alternatively, a range image or range image stream extracted by the image designation section 5 may be directly input to the image comparison section 3 to be used as an image to be compared.

In this manner, a range image stream indicating a motion sequence to be recognized is registered in advance in the image holding section 6, is extracted by the image designation section 5, and can be compared with a range image stream captured by the image capture section 1.

That is, according to this modification, whether or not registered motion has taken place can be recognized.

When range images that have undergone a deformation process equivalent to that in the image deformation section 2 are held in the image holding section 5, comparison can be made without requiring any computation cost for the deformation process in the image deformation section 2. In this manner, real-time performance can be further improved.

(Fourth Embodiment)

The fourth embodiment of the present invention will be described below.

Figure 33:
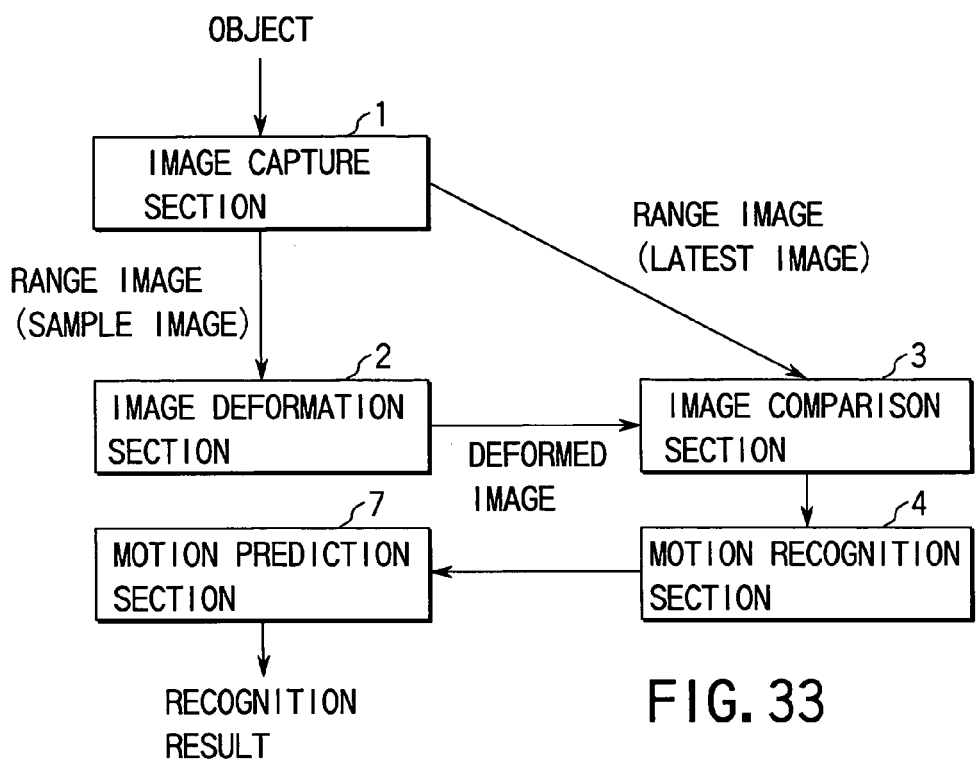
FIG. 33 is a schematic block diagram showing an example of the arrangement of an image recognition apparatus according to the fourth embodiment of the present invention.

FIG. 33 is a block diagram showing the overall arrangement of an image recognition apparatus according to the fourth embodiment of the present invention.

The image recognition apparatus of this embodiment comprises a motion prediction section 7 that predicts future motion in addition to the arrangement of the image recognition apparatus of the second embodiment.

The motion prediction section 7 will be explained first.

The motion prediction section 7 predicts future motion using the result of the motion recognition section 4.

For example, when an object successively "rotates about the vertical axis" three times, it is predicted that the object will "rotate about the vertical axis" or will "quit its motion" in the next frame (a frame one frame after the current frame).

In this case, as keys for prediction, background knowledge such as a structural nature or the like of the object may be taken into consideration in addition to the result in the aforementioned motion recognition section 4. For example, the fingers of a person have a limited motion range due to their structures. Such knowledge may be considered as a key for prediction.

The motion prediction section 7 may have a table that stores expected motions in response to motion (e.g., three successive rotations about the vertical axis) recognized by the motion recognition section 4, and may make motion prediction with reference to this table.

In this manner, the next motion of the object can be predicted.

(First Modification of Fourth Embodiment)

Figure 34:
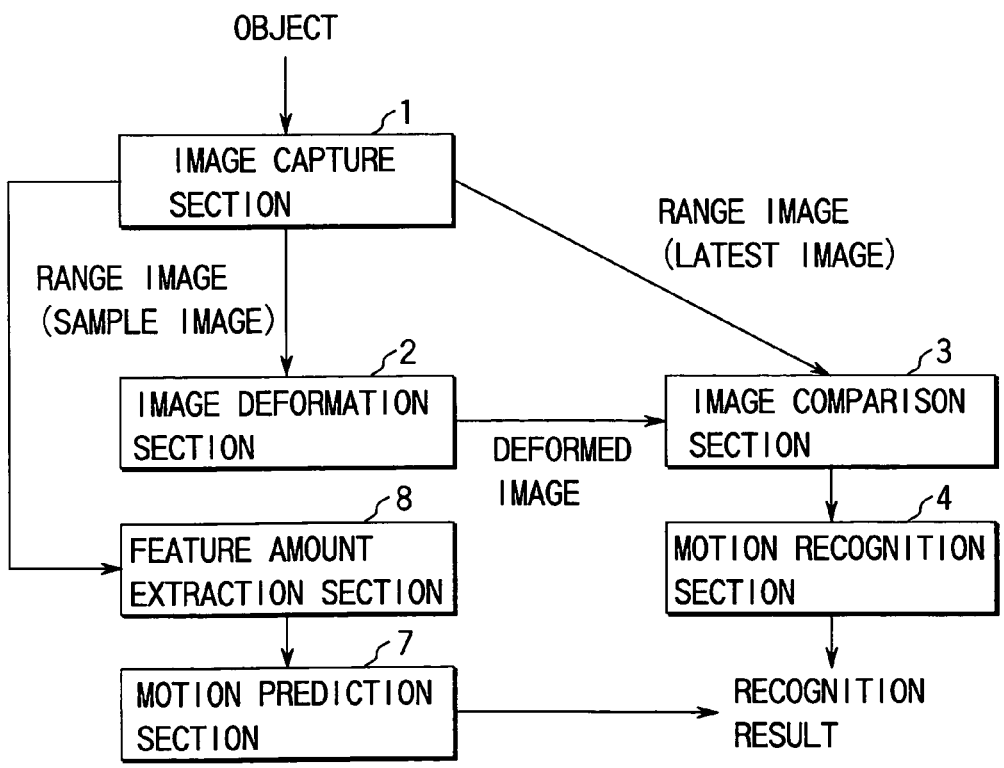
FIG. 34 is a schematic block diagram showing an example of the arrangement of an image recognition apparatus according to the first modification of the fourth embodiment of the present invention.

The image recognition apparatus of the fourth embodiment comprises the motion prediction section 7 for predicting motion using the recognition result in the motion recognition section 4. In place of that motion prediction section 7, the apparatus may comprise a feature amount extraction section 8 for extracting a feature amount from a range image or range image stream captured by the image capture section 1 or the like, and a motion prediction section 7 for predicting motion using information of the feature amount from the feature amount extraction section 8, as shown in FIG. 34.

In this case, the feature amount extraction section 8 extracts the feature amount of an object; for example, the barycentric position of the object from a range image, the barycentric speed of the object from a range image stream, and the like.

A case will be explained below a barycentric position G of an object is computed from a range image.

Case 1: When range image is handled intact:

$$G_x = \frac{\sum_{y=0}^{n-1}\left(\sum_{x=0}^{m-1}F(x,y)\right)*x}{\sum_{x=0}^{m-1}\sum_{y=0}^{n-1}F(x,y)}, G_y = \frac{\sum_{y=0}^{m-1}\left(\sum_{x=0}^{n-1}F(x,y)\right)*x}{\sum_{x=0}^{m-1}\sum_{y=0}^{n-1}F(x,y)}, \quad (3)$$

$$G_z = \frac{\sum_{x=0}^{m-1}\sum_{y=0}^{n-1}F(x,y)^2}{2*\sum_{x=0}^{m-1}\sum_{y=0}^{n-1}F(x,y)}$$

Case 2: When range image is handled as shown in FIG. 9B:

$$G_x = \frac{\sum_{y=0}^{n-1}\sum_{x=0}^{m-1}c(x,y)(F(x,y)-(F_{min}))*x}{\sum_{x=0}^{m-1}\sum_{y=0}^{n-1}c(x,y)(F(x,y)-F_{min})}, \quad (4)$$

$$G_y = \frac{\sum_{y=0}^{n-1}\sum_{x=0}^{m-1}c(x,y)(F(x,y)-F_{min})*y}{\sum_{x=0}^{m-1}\sum_{y=0}^{n-1}c(x,y)F(x,y)},$$

$$G_z = \frac{\sum_{x=0}^{m-1}\sum_{y=0}^{n-1}c(x,y)(F(x,y)^2-F_{min}^2)}{2*\sum_{x=0}^{m-1}\sum_{y=0}^{n-1}c(x,y)(F(x,y)-F_{min})}$$

where Fmin is a minimum value (kilo) of F(x, y).

Case 3: when only surface of range image is handled, as shown in FIG. 9D:

$$G_x = \frac{\sum_{y=0}^{n-1}\sum_{x=0}^{m-1}c(x,y)*x}{\sum_{x=0}^{m-1}\sum_{y=0}^{n-1}c(x,y)}, G_y = \frac{\sum_{y=0}^{n-1}\sum_{x=0}^{m-1}c(x,y)*y}{\sum_{x=0}^{m-1}\sum_{y=0}^{n-1}F(x,y)}, \quad (5)$$

-continued $$G_z = \frac{\sum_{x=0}^{m-1}\sum_{y=0}^{n-1}F(x,y)}{\sum_{x=0}^{m-1}\sum_{y=0}^{n-1}c(x,y)}$$

$$G_x = \frac{\sum_{y=0}^{n-1}\sum_{x=0}^{m-1}c(x,y)*x}{\sum_{x=0}^{m-1}\sum_{y=0}^{n-1}c(x,y)}, G_y = \frac{\sum_{y=0}^{n-1}\sum_{x=0}^{m-1}c(x,y)*y}{\sum_{x=0}^{m-1}\sum_{y=0}^{n-1}F(x,y)},$$

$$G_z = \frac{\sum_{x=0}^{m-1}\sum_{y=0}^{n-1}F(x,y)}{\sum_{x=0}^{m-1}\sum_{y=0}^{n-1}c(x,y)}$$

In equations (3) to (5), F(x, y) is the pixel value of a pixel (x, y), and C(x, y) is a function defined as:

When F(x, y)≠0, C(x, y)=1

Otherwise, C(x, y)=0

Also, m and n are the x- and y-sizes (the numbers of pixels) of a frame.

The speed of the barycentric position can be easily computed from the moving amount of the barycentric positions of the objects extracted from continuously captured range images, and that time interval.

Note that the barycentric position and speed have been exemplified as feature amounts. However, the present invention is not limited to such specific feature amounts, and various other feature amounts such as features of the area, volume, shape, and the like of an object can be used. Since these feature amounts can be easily obtained from edge information, depth information, and the like of an object extracted from a range image using a conventional scheme, a detailed description thereof will be omitted.

The motion prediction section 7 then predicts the next motion using feature amounts such as changes in barycentric position, barycentric speed, and the like of the object obtained by the feature amount extraction section 8 as keys.

In this manner as well, the next motion of the object can be predicted as in the fourth embodiment.

Furthermore, the motion prediction section 7 may simultaneously use both the result of the motion recognition section 4 that has been explained in the fourth embodiment, and the feature amount extracted by the feature amount extraction section 8 so as to predict the next motion.

In this manner, more stable and reliable prediction can be implemented since more kinds of information can be used as keys for prediction.

For example, when an airbag is to be inflated upon vehicle accident, if a person is present within a very close range, the airbag must be inhibited from being inflated. However, a conventional distance sensor using an ultrasonic wave, infrared light, or the like can detect whether or not an object is present within a given range, but cannot discriminate whether the object is a fly, a ball thrown by a child in the rear passenger seat, or a person. According to the present invention, a person or other objects can be distinguished with high precision on the basis of the feature amount such as a volume or the like computed from a range image by the feature amount extraction section 8, and the motion of a person predicted by the motion prediction section 7.

Figure 35:
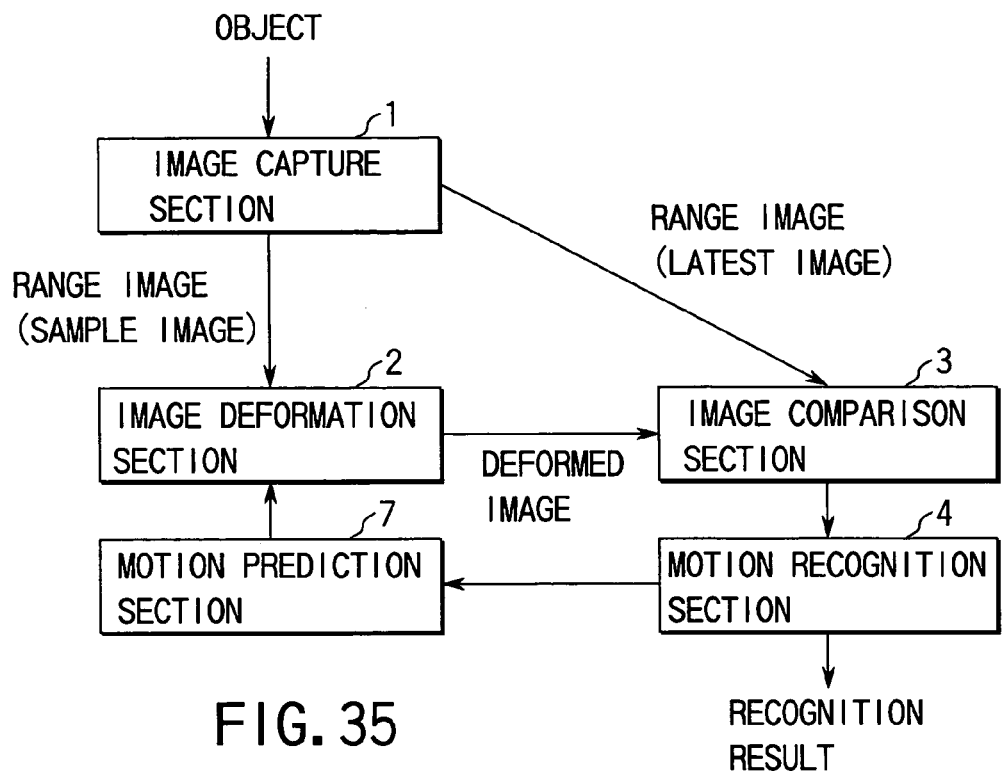
FIG. 35 is a schematic block diagram showing an example of the arrangement of an image recognition apparatus according to the second modification of the fourth embodiment of the present invention.

(Second Modification of the Fourth Embodiment) As shown in FIG. 35, the result of the motion prediction section 7 may be used as a key for computing a deformation parameter in the image deformation section 2.

For example, the third modification of the first embodiment has explained the method of deforming a range image of an object in the four, i.e., up, down, right, and left directions. When motion is predicted using the motion prediction section 7, a possible deformation method can be determined. For example, when it is predicted that the object is unlikely to rotate in the right direction, it can be determined that a range image need only be deformed in only the three, i.e., up, down, and left directions. In this manner, the number of deformations can be limited.

In this manner, an unwanted deformation process can be omitted, and extra computation cost can be reduced, thus further improving real-time performance of recognition.

(Third Modification of Fourth Embodiment)

The arrangement shown in FIG. 34 or 35 may further comprise the image holding section 6 for holding range images captured by the image capture section 1 and deformed images generated by the image deformation section 2, as has been explained in the third embodiment.

In this case, an image recognition apparatus which can obtain the effects of the third embodiment in addition to those of this embodiment can be constructed.

(Fifth Embodiment)

The fifth embodiment of the present invention will be described below.

Figure 36:
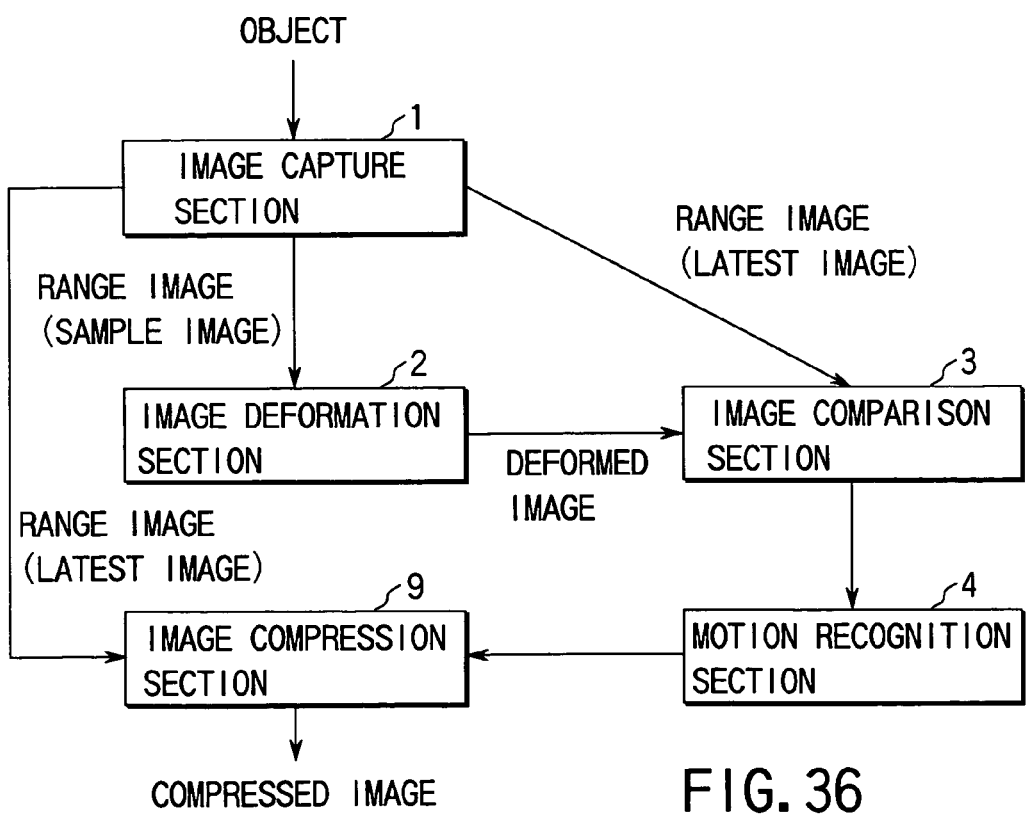
FIG. 36 is a schematic block diagram showing an example of the arrangement of an image recognition apparatus according to the fifth embodiment of the present invention.

FIG. 36 shows an example of the arrangement of an image recognition apparatus according to the fifth embodiment of the present invention.

The image recognition apparatus of this embodiment comprises an image compression section 9 for compressing an image on the basis of the recognition result of the image recognition apparatus in addition to the arrangement of the image recognition apparatus of the first, second, third, or fourth embodiment.

With this arrangement, a range image can be compressed using the result obtained by the first, second, third, or fourth embodiment.

In FIG. 36, a range image is compressed on the basis of various parameters used in the image deformation section 2 using the recognition result in the motion recognition section 4. However, the present invention is not limited to such specific arrangement. For example, a range image may be compressed on the basis of various parameters used in the image deformation section 2 using the recognition result in the image comparison section 3. That is, the present invention is not particularly limited as long as a range image is compressed on the basis of various parameters and the like used in the image deformation section using the recognition result.

The image compression section 9 will be explained below.

The image compression section 9 compresses data of a range image or range image stream captured by the image capture section 1 or the like on the basis of the recognition result.

In this case, the image compression method can be either reversible or irreversible compression depending on purposes.

More specifically, compression is done by the following method.

For example, when the image compression section 9 is added to the image recognition apparatus with the arrangement shown in FIG. 31, that has been explained in the second modification of the second embodiment, arbitrary motions of an object in the motion recognition section 4 can be equated.

Hence, for example, actual range image data are held at 5-frame intervals, and only deformation parameter values used upon deforming a range image in the image deformation section 2 are held in place of actual range image data for four frames between the held range image data, thus forming compressed images.

Since the actual range image data requires 8 bits per pixel in case when it is defined by 64 pixels (vertical)×64 pixels (horizontal)×256 gray levels (depth), a total data size of 64×64×8=32,768 bits=4,096 bytes is required. That is, if the data size of deformation parameters is smaller than this required data size, data is to be compressed. For example, in case of rotation deformation, the parameters required are the coordinate position (x, y, z) of the center of rotation, and rotation angles ($\theta x$, $\theta y$, $\theta z$). Since each of x, y, and z need only express a value ranging from 0 to 64, it requires 6 bits. Since each rotation angle need only express a value ranging from 0 to 360, it requires 9 bits in case of integer precision (32 bits even in case of floating point precision). That is, in rotation deformation, the total data size required for the parameter values is around 45 bits (around 114 bits even in case of floating point precision). The same applies to deformations other than rotation deformation. Since this data size is on the order greatly smaller than 4,096 bytes before compression, a very high compression ratio can be expected in image compression by the method of this embodiment.

In order to decompress the obtained compressed image, deformed images can be sequentially generated using deformation parameter values on the basis of actual range image data present at specific frame intervals. That is, an image decompression device for decompressing compressed image data, which includes actual range image data present at specific frame intervals and motion parameters required for reconstructing range images between the actual range image data (the compressed image data may be passed using a predetermined recording medium such as a floppy disk or the like or using communications using computer networks) must have a mechanism having at least functions similar to those of the aforementioned image deformation section 2.

The conventional image compression method such as MPEG (Motion Picture Experts Group) 1, MPEG2, MPEG4, or the like independently compresses two-dimensional images in units frames or using difference signals from the previous and next frames. By contrast, the present invention compresses three-dimensional range images using extracted motion parameters unlike in the conventional method.

(Sixth Embodiment)

The sixth embodiment of the present invention will be described below.

Figure 37:
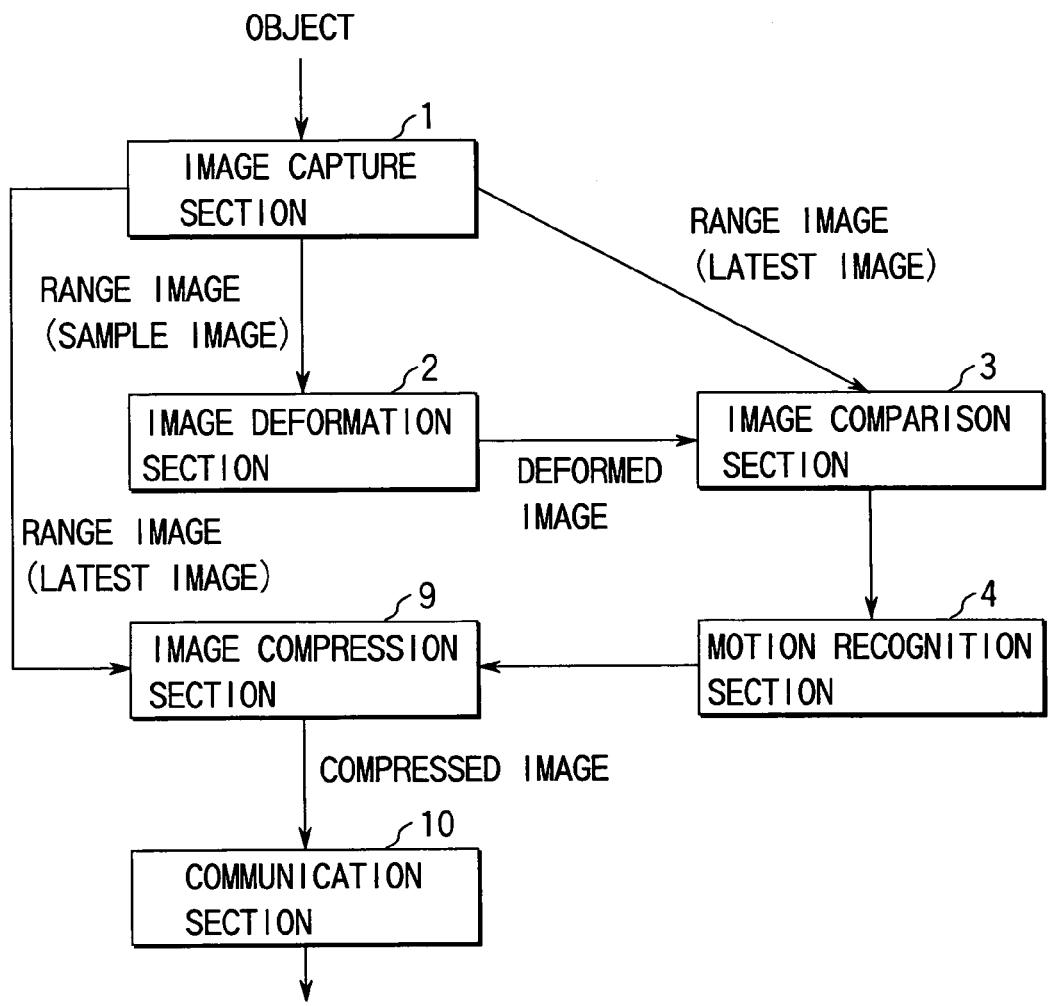
FIG. 37 is a schematic block diagram showing an example of the arrangement of an image recognition apparatus according to the sixth embodiment of the present invention.

FIG. 37 shows an example of the arrangement of an image recognition apparatus according to the sixth embodiment of the present invention.

The image recognition apparatus of this embodiment comprises a communication section 10 for communicating with an external apparatus in addition to the arrangement of the image recognition apparatus of the first, second, third, fourth, or fifth embodiment.

With this arrangement, the result obtained in the first, second, third, fourth, or fifth embodiment can be sent to an external apparatus using a communication path such as a telephone line or the like.

For example, when the communication section 10 is added to the image recognition apparatus of the fifth embodiment, only compressed image data described in the fifth embodiment is sent, and a receiving apparatus decompresses it so that only compressed data with a small size can be sent onto the communication path although the receiving apparatus can obtain range image data with a large size.

In this way, an increase in data size upon communication, that has posed a program in conventional moving picture communications, can be avoided, and the recognition result of the image recognition apparatus of the present invention can be effectively sent to another place via the Internet or the like.

For example, even when users at remote places play a physical game such as jyanken (a kind of mora or a tossup), boxing, or the like, they can exchange three-dimensional images with each other in real time by compressing and communicating captured three-dimensional range images of the hand, body, or the like. That is, since three-dimensional hand and body data can be sent and reconstructed at remote places, the users can feel, using very low-cost apparatuses, as if they were playing the game at that place, thus providing great practical effects.

(Other)

Note that the aforementioned embodiments and modifications can be appropriately combined.

In appropriate combinations of the aforementioned embodiments and modifications, the image capture section 1 may be omitted, and an apparatus which recognizes motions based on input range images or range image stream, or make various processes based on the recognition result may be built.

The above-mentioned building components can be implemented by software except for the image sensing unit of the image capture section 1. That is, the aforementioned sequences can be recorded on a computer-readable recording medium as a program that can be executed by a computer, and that medium can be distributed.

The present invention is not limited to the above embodiments, and various changes and modification may be made within its technical scope.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image recognition method for recognizing an object, comprising:
    capturing the object to generate a range image having three-dimensional information representing a three-dimensional shape of the object;
    generating a three-dimensional deformed image by three-dimensionally deforming the range image;
    recognizing three-dimensional motion of the object in the range image by comparing the deformed image with a newly captured range image obtained by capturing the object currently; and
    segmenting the range image of the object in units of voxels according to a distance value of the range image,
    wherein the deformed image is generated by deforming the range image based on a position of the voxel.

2. A method according to claim 1, further comprising predicting motion of the object on the basis of a feature amount of the object extracted from the captured range image.

3. A method according to claim 1, further comprising the step of compressing a range image captured by an image capture unit on the basis of the recognized motion of the object.

4. An image recognition apparatus to recognize an object, comprising:
    an image capture unit configured to capture the object to generate a range image having three-dimensional information representing the object;
    an image deformation unit configured to three-dimensionally deform the range image;
    a recognition unit configured to recognize three-dimensional motion of an object by comparing a three-dimensionally deformed image obtained by said image deformation unit with a new range image captured by said image capture unit; and
    a segmentation unit configured to segment the range image of the object in units of voxels according to a distance value of the range image,
    wherein the deformation unit is configured to three-dimensionally deform the range image based on a position of the voxel.

5. An apparatus according to claim 4, further comprising:
    a feature amount extraction unit configured to extract a feature amount of the object from the range image captured by said image capture unit; and
    a prediction unit configured to predict motion of the object on the basis of the feature amount extracted by said feature amount extraction unit.

6. An apparatus according to claim 4, further comprising:
    an image compression unit configured to compress the range image captured by said image capture unit on the basis of the recognized motion of the object.

7. An article of manufacture comprised of a computer-usable medium having computer-readable program code means that implements computer-readable program code means for recognizing an object, comprising:
    computer-readable program code means for making a computer generate a range image having three-dimensional information representing a three-dimensional shape of the object;
    computer-readable program code means for making the computer three-dimensionally deform the range image to generate a deformed image;
    computer-readable program code means for making the computer recognize three-dimensional motion of the object by comparing the deformed image with a new range image generated currently; and
    computer-readable program code means for making the computer segment the range image of the object in units of voxels according to a distance value of the range image,
    wherein the deformed image is generated by deforming the range image based on a position of the voxel.

* * * * *

UNITED STATES PATENT AND TRADEMARK OFFICE
CERTIFICATE OF CORRECTION

PATENT NO. : 7,035,433 B1
APPLICATION NO. : 09/471497
DATED : April 25, 2006
INVENTOR(S) : Mihara et al.

It is certified that error appears in the above-identified patent and that said Letters Patent is hereby corrected as shown below:

On the title page, Item (73), the Assignee is incorrect. Item (73) should read:
-- (73)   Kabushiki Kaisha Toshiba, Kawasaki
          (JP) --

Signed and Sealed this

First Day of August, 2006

JON W. DUDAS
*Director of the United States Patent and Trademark Office*